(12) United States Patent
Sato et al.

(10) Patent No.: US 10,227,454 B2
(45) Date of Patent: Mar. 12, 2019

(54) PHENYL-MODIFIED HYBRID PREPOLYMER, PHENYL-MODIFIED POLYDIMETHYLSILOXANE-BASED HYBRID PREPOLYMER, AND PHENYL-MODIFIED POLYDIMETHYLSILOXANE-BASED HYBRID POLYMER, AND PRODUCTION PROCESSES THEREFOR

(71) Applicants: NIHON YAMAMURA GLASS CO., LTD., Hyogo (JP); JNC CORPORATION, Tokyo (JP)

(72) Inventors: Midori Sato, Hyogo (JP); Takuya Shindo, Hyogo (JP); Yuichi Isoda, Kumamoto (JP); Kozaburo Matsumura, Tokyo (JP)

(73) Assignees: NIHON YAMAMURA GLASS CO., LTD., Hyogo (JP); JNC CORPORATION, Tokyo (JP)

( * ) Notice: Subject to any disclaimer, the term of this patent is extended or adjusted under 35 U.S.C. 154(b) by 0 days.

(21) Appl. No.: 15/535,661

(22) PCT Filed: Dec. 24, 2015

(86) PCT No.: PCT/JP2015/086054
§ 371 (c)(1),
(2) Date: Jun. 14, 2017

(87) PCT Pub. No.: WO2016/104621
PCT Pub. Date: Jun. 30, 2016

(65) Prior Publication Data
US 2018/0273689 A1 Sep. 27, 2018

(30) Foreign Application Priority Data
Dec. 25, 2014 (JP) .................. 2014-262553

(51) Int. Cl.
*C08G 77/18* (2006.01)
*C08G 77/04* (2006.01)
(Continued)

(52) U.S. Cl.
CPC ............. *C08G 77/18* (2013.01); *C08G 77/04* (2013.01); *C08G 77/38* (2013.01); *C08G 77/70* (2013.01); *C08G 77/80* (2013.01)

(58) Field of Classification Search
None
See application file for complete search history.

(56) References Cited

U.S. PATENT DOCUMENTS 3,079,281 A * 2/1963 Dexter ................. B05D 7/26
427/386
3,146,799 A * 9/1964 Fekete ................. C08K 3/38
156/329

(Continued)

FOREIGN PATENT DOCUMENTS

JP S59131631 A 7/1984
JP 64-26639 A 1/1989
(Continued)

OTHER PUBLICATIONS

International Search Report for PCT/JP2015/086054 dated Feb. 9, 2016.
(Continued)

*Primary Examiner* — Robert S Loewe
(74) *Attorney, Agent, or Firm* — Millen, White, Zelano & Branigan, PC

(57) ABSTRACT

Disclosed herein are a phenyl-modified hybrid prepolymer, a phenyl-modified polydimethylsiloxane-based hybrid prepolymer, and a phenyl-modified polydimethylsiloxane-based hybrid polymer capable of controlling material hardness or surface tackiness depending on the intended use or (Continued)

purpose. A phenyl-modified hybrid prepolymer (B) is prepared by subjecting polydimethylsiloxane having trialkoxysilyl groups at both ends, phenyltrialkoxysilane, and diphenyldialkoxysilane to hydrolysis and condensation reaction. A phenyl-modified polydimethylsiloxane-based hybrid prepolymer (C) comprises (B), and is preferably prepared by mixing (B) and a phenyl-modified hybrid prepolymer (A) prepared by condensation reaction between polydimethylsiloxane having silanol groups at both ends and phenyltrialkoxysilane. The phenyl-modified polydimethylsiloxane-based hybrid polymer is obtained by heating and solidifying (C).

32 Claims, 1 Drawing Sheet

(51) Int. Cl.
*C08G 77/38* (2006.01)
*C08G 77/00* (2006.01)

(56) References Cited

U.S. PATENT DOCUMENTS

| | | | | |
|---|---|---|---|---|
| 3,175,994 A * | 3/1965 | Katchman | ............... | C08G 77/00 428/447 |
| 3,632,794 A * | 1/1972 | Antonen | ................ | C08G 77/16 528/34 |
| 3,865,766 A * | 2/1975 | Merrill | ................... | C08G 77/08 528/15 |
| 3,887,514 A * | 6/1975 | Merrill | ................... | C08G 77/06 524/863 |
| 4,056,492 A * | 11/1977 | Merrill | ................... | C08G 77/06 528/10 |
| 4,085,084 A * | 4/1978 | Merrill | ................... | C08G 77/06 524/474 |
| 4,390,651 A * | 6/1983 | Brown, Jr. | ............. | C08G 77/04 524/267 |
| 4,536,590 A * | 8/1985 | Brown, Jr. | ............. | C08G 77/04 556/453 |
| 4,560,711 A * | 12/1985 | Suzuki | ..................... | C08K 9/06 523/212 |
| 5,991,493 A * | 11/1999 | Dawes | .................... | C03B 19/12 385/141 |
| 2013/0296514 A1* | 11/2013 | Choi | ....................... | C08L 83/04 526/279 |

FOREIGN PATENT DOCUMENTS

| | | |
|---|---|---|
| JP | 2008-50490 A | 3/2008 |
| JP | 2009292970 A | 12/2009 |
| WO | 2013125714 A1 | 8/2013 |

OTHER PUBLICATIONS

English Abstract for WO2013125714, Publication Date: Aug. 29, 2013.
English Abstract for JP2009292970, Publication Date: Dec. 17, 2009.
English Abstract for JPS59131631, Publication Date: Jul. 28, 1984.
English Abstract for JPS6426639, Publication Date: Jan. 27, 1989.
English Abstract for JP2008050490, Publication Date: Mar. 6, 2008.

* cited by examiner (S1)
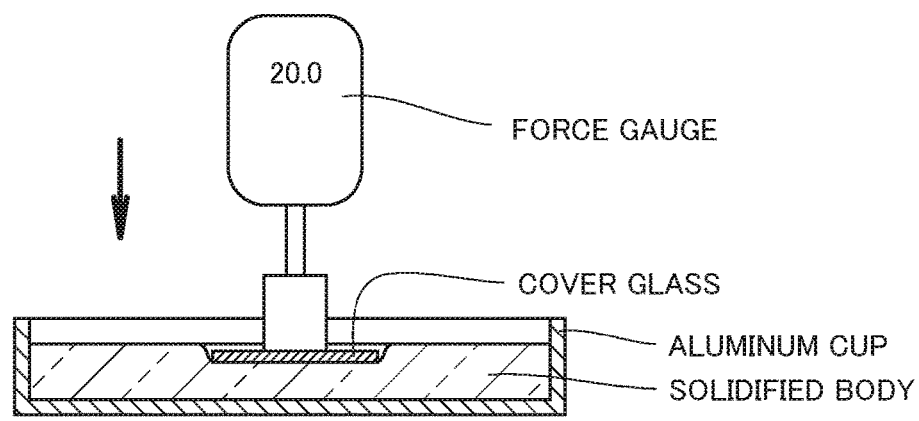
(S2)
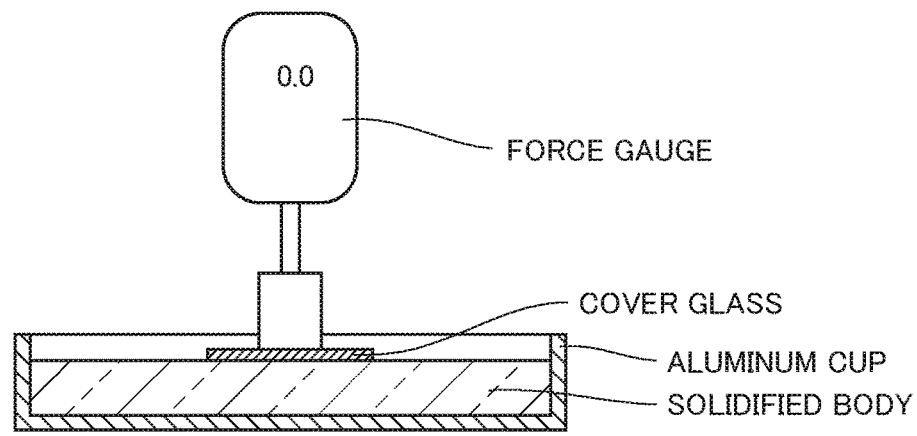
(S3)
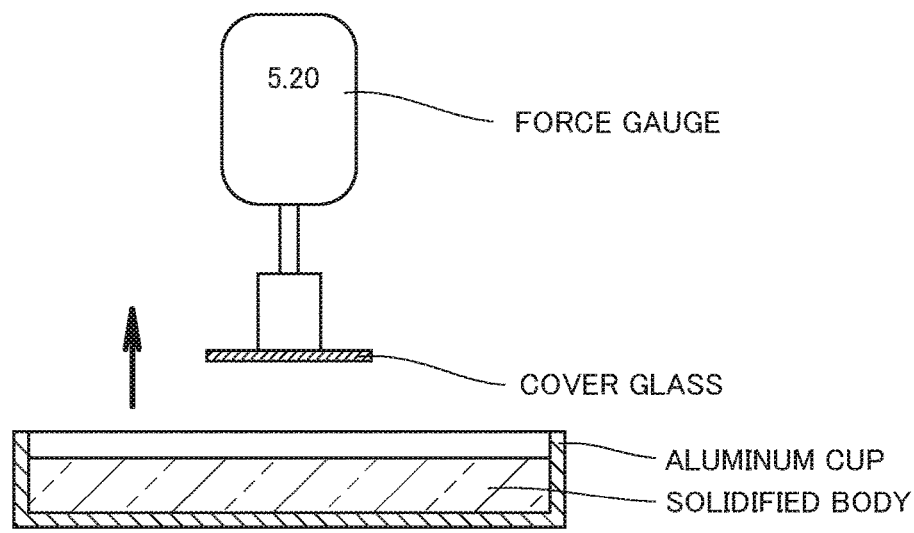

PHENYL-MODIFIED HYBRID PREPOLYMER, PHENYL-MODIFIED POLYDIMETHYLSILOXANE-BASED HYBRID PREPOLYMER, AND PHENYL-MODIFIED POLYDIMETHYLSILOXANE-BASED HYBRID POLYMER, AND PRODUCTION PROCESSES THEREFOR

TECHNICAL FIELD

The present invention relates to a phenyl-modified hybrid prepolymer, a phenyl-modified polydimethylsiloxane-based hybrid prepolymer containing the phenyl-modified hybrid prepolymer, a phenyl-modified polydimethylsiloxane-based hybrid prepolymer prepared by mixing the phenyl-modified hybrid prepolymer and another phenyl-modified hybrid prepolymer, and a phenyl-modified polydimethylsiloxane-based hybrid polymer obtained by heating and solidifying the phenyl-modified polydimethylsiloxane-based hybrid prepolymer, and production methods thereof.

BACKGROUND ART

There are demands for heat-resistant elastic materials in various fields such as adhesives, pressure-sensitive adhesives, sealing materials, heat dissipation, insulating, protective, and transfer sheets or films, greases, and coating films. In these application fields, there are various requirements concerning material hardness after solidification and surface properties. For example, sealing materials for LEDs are sometimes required to bond or adhere to a protective glass plate or a diffusion plate, or are sometimes required to have a tack-free release surface that does not adhere to a covering film used during transfer or for packing. Members for transferring flexible printed circuits (FPCs), called "heat-resistant carrier," are required to have various levels of surface tack force depending on the types of FPCs to be transferred.

Such a demand for surface control may be satisfied not only by selecting the type of polymer as a base material but also by blending an inorganic filler into a base material having high tackiness to reduce and control tackiness. However, blending for developing tackiness generally tends to reduce heat resistance, and a tack-free material tends to be a hard material having high hardness. Addition of a filler also causes a problem with dispersibility or a reduction in adhesive force. Further, it is not technically easy to control surface properties in an environment in which a material is required to have heat resistance. As described above, a material having tackiness is generally poor in heat resistance, and addition of a filler for the purpose of controlling tackiness increases material hardness and reduces resistance to thermal shock.

Silicone resins have heretofore been used as heat-resistant materials. Silicone resins having low hardness and relatively high heat resistance have been practically used for a long time and variously improved. As a result, various developments have been made such as a reduction in cyclic siloxane component, an improvement in oil resistance, and an improvement in heat resistance that have been major issues. On the other hand, however, issues such as adhesiveness to a substrate or the like, electrical insulating properties, and gas barrier properties have not yet been resolved. This is because these many desired properties conflict with one another, and therefore it is difficult to achieve all the desired properties at the same time.

In order to develop these many desired properties, hybrid materials have been studied which utilize synergy between the properties of an organic component and the properties of an inorganic component. Particularly, many study results on and patents for phenyl-modified hybrids, which use, as raw materials, an alkoxide and a siloxane polymer mainly containing polydimethylsiloxane, have been reported by the present inventors etc. (Patent Literatures 1 to 4). These hybrids are greatly expected to be a breakthrough for electrical members or optical members due to the heat-resistant properties and flexibility of polydimethylsiloxane.

CITATIONS LIST

Patent Literatures

Patent Literature 1: WO 2013/125714
Patent Literature 2: JP 2007-116139 A
Patent Literature 3: JP 2013-129733 A
Patent Literature 4: WO 2014/098189

SUMMARY OF INVENTION

Technical Problems

An issue of such a hybrid material is the control of material hardness or surface tackiness. Covalent bonds in a hybrid material are formed by dehydration or dealcoholization reaction, but when a reaction rate is low and the thickness of a film is large, the reaction proceeds more slowly in a lower layer than in an upper layer, and therefore the concentration of unreacted sites present in the film depends on the film thickness so that the film is often poorly solidified during heat treatment. Further, a siloxane polymer having high flexibility and high heat resistance sometimes has surface tack (tackiness) developed by unreacted sites or developed as the original property of a siloxane structure. Such tack is advantageous when tackiness or adhesiveness is required or when some heat dissipation sheets are required to have close adhesion properties, but becomes a major problem when in an optical member, releasability from a film used for surface protection, releasability from a transfer unit used during operation, or releasability from a mold for forming a molded body is required. Further, a hybrid material that is likely to be influenced by moisture also has a problem in its properties because its tackiness is slightly changed by the humidity of the atmosphere.

On the other hand, there is also a case where surface tackiness (tack) developed by a reduction in hardness is required to be increased. For example, the above-described heat dissipation member needs to satisfy such a requirement. The technique of dissipating heat from a heat generator is utilized in many fields. Everyone has experienced a phenomenon in which an arithmetic element in a personal computer or a game machine is stopped by heat (called "freeze"), and LED lighting or the like is also required to release heat. For such a purpose, a heat generator and a heat dissipator (heat sink or outer package) are required to come into close contact with each other as much as possible to eliminate an air layer. In this case, close adhesion properties developed by a reduction in hardness are required of the heat dissipation member to fill the surface micro-irregularities of a heat dissipator made of metal or ceramic.

As for surface tackiness, when a material is supplied as a product such as a heat dissipation sheet, there is also a case where the tackiness of the material is required to be controlled so that the sheet can be temporarily adhered in the step of attaching the sheet to a heat generator. When the material has the property that the attached sheet is kept adhered without falling until the next step, in which the sheet is fixed, in a continuous production line, production costs are effectively reduced.

As for such tackiness, even when a heat-conducting layer is required to have such close adhesion properties, surface properties required of the heat-conducting layer varies because the heat-conducting layer is required to be semi-permanently fixed in some cases, but is required to be repeatedly attached and detached for the purpose of component replacement or the like in other cases.

For the above reasons, surface properties required of a heat dissipation sheet or the like widely range from releasability to strong tackiness, and therefore a technique to freely control surface properties is required to achieve desired surface properties. If such a control technique cannot be established, material design needs to be re-examined every time desired surface properties are changed. Patent Literatures 1 to 4 disclose materials having excellent heat resistance, but do not suggest such a technique to freely control surface properties.

The flexibility (low hardness) or hardness or surface tackiness or surface releasability of a solidified body may be adjusted by blending two or more prepolymers having different properties in any ratio. However, when the prepolymers have poor compatibility for blending, the resulting mixture devitrifies, and phase separation occurs after solidification or one of the components is poorly solidified, which makes it difficult to obtain a desired solidified body. When the prepolymers are different in curing conditions such as solidification start and end temperatures and heat-resistant properties after solidification, the resulting solidified body does not have homogeneity or stable physical properties. On the other hand, when the prepolymers have compatibility or similar properties, the resulting solidified bodies have similar physical properties, and therefore it is difficult to obtain solidified bodies that are extremely different in physical properties such as one having high tackiness and one having high releasability. Further, all the prepolymers need to have heat-resistant properties. If any one of the prepolymers has low heat resistance, heat-resistant properties after blending are reduced, which causes a change in properties.

Further, surface releasability may be controlled by adding a filler or a surface modifier or by performing surface modification treatment such as UV irradiation or plasma treatment after solidification. However, in the former case, there is a problem such as a reduction in transparency or a reduction in heat-resistant properties, and in the latter case, there is a problem that equipment for modification treatment is required, the number of processing steps increases, or surface roughening occurs.

In order to solve the above conventional problems, it is an object of the present invention to provide a phenyl-modified hybrid prepolymer capable of controlling material hardness or surface tackiness depending on the intended use or purpose, a phenyl-modified polydimethylsiloxane-based hybrid prepolymer containing the phenyl-modified hybrid prepolymer, a phenyl-modified polydimethylsiloxane-based hybrid prepolymer prepared by mixing the phenyl-modified hybrid prepolymer and another phenyl-modified hybrid prepolymer, and a phenyl-modified polydimethylsiloxane-based hybrid polymer obtained by heating and solidifying the phenyl-modified polydimethylsiloxane-based hybrid prepolymer.

Solutions to Problems

A phenyl-modified hybrid prepolymer (B) according to a first aspect of the present invention is a prepolymer (partial or complete hydrolysis condensate) prepared by subjecting polydimethylsiloxane having trialkoxysilyl groups at both ends, phenyltrialkoxysilane, and diphenyldialkoxysilane to hydrolysis and condensation reaction.

The phenyl-modified hybrid prepolymer (B) according to the first aspect of the present invention is preferably prepared using polydimethylsiloxane having trialkoxysilyl groups at both ends which has a number-average molecular weight (Mn) of 3,000 to 30,000 and a distribution index of molecular weight (Mw/Mn; Mw is weight-average molecular weight) of 1.3 or less.

It is to be noted that in this description, the weight-average molecular weight (Mw) and the number-average molecular weight (Mn) are measured by gel-permeation chromatography (GPC) using polystyrene as a reference material and tetrahydrofuran as an eluent.

The phenyl-modified hybrid prepolymer (B) according to the first aspect of the present invention is preferably a prepolymer (partial or complete hydrolysis condensate) prepared by subjecting the polydimethylsiloxane having trialkoxysilyl groups at both ends, the phenyltrialkoxysilane, and the diphenyldialkoxysilane to hydrolysis and condensation reaction in a molar ratio of 1:0.5 to 3:0.5 to 3.

The phenyl-modified hybrid prepolymer (B) according to the first aspect of the present invention is preferably prepared using an alkoxide of titanium as a condensation catalyst.

As a result of study, the present inventors have found that a solidified body (gelled body) whose hardness and surface tackiness (tack force) are controlled depending on the intended use can be obtained by heating and solidifying a phenyl group-containing polydimethylsiloxane-based hybrid prepolymer (C) prepared by appropriately mixing two phenyl-modified hybrid prepolymers (A) and (B) that are different in structure and are well compatible with each other, or by heating and solidifying only a phenyl-modified hybrid prepolymer (B).

Based on such a finding of the present inventors, the present invention is configured as follows. A phenyl-modified polydimethylsiloxane-based hybrid prepolymer (C) according to the first aspect of the present invention comprises at least any one of the above phenyl-modified hybrid prepolymers (B). The phenyl-modified polydimethylsiloxane-based hybrid prepolymer (C) according to the present invention is preferably prepared by mixing any one of the above phenyl-modified hybrid prepolymers (B) and a phenyl-modified hybrid prepolymer (A) prepared (as a condensate) by condensation reaction between polydimethylsiloxane having silanol groups at both ends and phenyltrialkoxysilane.

In the phenyl-modified polydimethylsiloxane-based hybrid prepolymer (C) according to the first aspect of the present invention, the polydimethylsiloxane having silanol groups at both ends used to prepare the phenyl-modified hybrid prepolymer (A) preferably has a number-average molecular weight (Mn) of 18,000 to 60,000 and a distribution index of molecular weight (Mw/Mn; Mw is weight-average molecular weight) of 1.4 or less.

In the phenyl-modified polydimethylsiloxane-based hybrid prepolymer (C) according to the first aspect of the present invention, the polydimethylsiloxane having silanol groups at both ends used to prepare the phenyl-modified hybrid prepolymer (A) preferably has a larger number-average molecular weight (Mn) than the polydimethylsiloxane having trialkoxysilyl groups at both ends used to prepare the phenyl-modified hybrid prepolymer (B).

In the phenyl-modified polydimethylsiloxane-based hybrid prepolymer (C) according to the first aspect of the present invention, the phenyl-modified hybrid prepolymer (A) is preferably prepared (as a condensate) by condensation reaction between the polydimethylsiloxane having silanol groups at both ends and the phenyltrialkoxysilane in a molar ratio of 1:0.5 to 5.

In the phenyl-modified polydimethylsiloxane-based hybrid prepolymer (C) according to the first aspect of the present invention, the phenyl-modified hybrid prepolymer (A) is preferably prepared using an alkoxide of titanium as a condensation catalyst.

A phenyl-modified polydimethylsiloxane-based hybrid polymer according to the first aspect of the present invention is obtained by heating and solidifying any one of the above phenyl-modified polydimethylsiloxane-based hybrid prepolymers (C).

Advantageous Effects of Invention

The phenyl-modified polydimethylsiloxane-based hybrid prepolymer can be applied for various purposes by changing the mixing ratio between the phenyl-modified hybrid prepolymer (A) and the phenyl-modified hybrid prepolymer (B) to control surface properties without revising or re-examining the material design of the prepolymer depending on the intended use or demand. Therefore, according to the present invention, it is possible to provide a phenyl-modified polydimethylsiloxane-based hybrid polymer for use in various fields requiring heat-resistant properties, such as heat-conducting members (e.g., heat dissipation sheets) and insulating members.

BRIEF DESCRIPTION OF DRAWING

FIG. 1 is an illustration schematically showing respective steps of a method for evaluating a tack force.

DESCRIPTION OF EMBODIMENTS

Hereinbelow, the present invention will be described in detail.

[Polydimethylsiloxane Having Silanol Groups at Both Ends (PDMS-1)]

PDMS as a raw material of a phenyl-modified hybrid prepolymer (A) having the effect of developing surface tackiness is polydimethylsiloxane having silanol groups at both ends (PDMS-1), and is preferably represented by the following general formula (1).

[Chemical Formula 1]

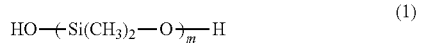

(1)

General polydimethylsiloxane has a relatively wide molecular weight distribution, and therefore varies in reaction time or reaction temperature. Therefore, its clear properties are usually poorly developed. The polydimethylsiloxane having silanol groups at both ends, which is used in the present invention as a raw material, is preferably homogeneous one produced by living anion polymerization or the like using an alkyl lithium as an initiator so as to have a narrow molecular weight distribution. The distribution index of molecular weight (Mw/Mn) of the polydimethylsiloxane having silanol groups at both ends, which is calculated as the ratio of weight-average molecular weight (Mw) to number-average molecular weight (Mn), is preferably 1.4 or less, more preferably 1.3 or less, even more preferably 1.2 or less, most preferably 1.1 or less. When the polydimethylsiloxane having silanol groups at both ends has a distribution index of molecular weight (Mw/Mn) of 1.4 or less, further 1.3 or less, phenyl modification reaction easily proceeds, and there is no fear that poor solidification occurs. Further, a solidified body (gelled body) of a phenyl-modified polydimethylsiloxane-based hybrid prepolymer (C), which will be described later, obtained by heating and solidifying a mixture of the phenyl-modified hybrid prepolymer (A) and a phenyl-modified hybrid prepolymer (B) that will be described later can maintain heat resistance over a long period of time. Further, when the polydimethylsiloxane having silanol groups at both ends has a distribution index of molecular weight (Mw/Mn) of 1.2 or less, further 1.1 or less, a solidified body (gelled body) of a phenyl-modified polydimethylsiloxane-based hybrid prepolymer (C) is obtained which is particularly excellent in heat resistance-maintaining properties at a high temperature of 200° C. or higher. If the distribution index of molecular weight (Mw/Mn) is larger than 1.4, there is a fear that phenyl modification reaction poorly proceeds due to a high ratio of a low-molecular weight component or a high-molecular weight component, or poor solidification occurs during solidification due to a large amount of an unreacted component, which is sometimes not preferred for use in an environment requiring heat resistance to which the present invention is applied.

Further, the polydimethylsiloxane (PDMS-1) as a raw material of the phenyl-modified hybrid prepolymer (A) preferably has a number-average molecular weight (Mn) of 18,000 to 60,000. When the number-average molecular weight (Mn) is 18,000 or more, the heat resistance of the solidified body can be improved while tackiness can be developed. Further, when the number-average molecular weight is 60,000 or less, the polydimethylsiloxane (PDMS-1) can be easily synthesized, and also phenyl-modified hybrid prepolymer (A) can be easily synthesized. If the number-average molecular weight (Mn) is less than 18,000, there is a case where the heat resistance of the solidified body is reduced and tackiness is poorly developed, and on the other hand, if the number-average molecular weight (Mn) exceeds 60,000, there is a case where it is difficult to synthesize the polydimethylsiloxane (PDMS-1) and the phenyl-modified hybrid prepolymer (A). In consideration of heat resistance-maintaining properties, tackiness, viscosity, ease of synthesis, etc., the number-average molecular weight is more preferably about 20,000 to 48,000, even more preferably 25,000 to 45,000, most preferably 30,000 to 40,000.

When heat resistance and flexibility are particularly desired, for example, when a gel-like material for use at a high temperature of 250° C. or higher caused by operation of power semiconductor such as SiC, is desired, PDMS having a number-average molecular weight (Mn) of 30,000 or more is required. However, when the molecular weight is increased, the distribution index of molecular weight is generally increased, and therefore synthesis conditions, such as temperature uniformity in a reaction vessel for producing PDMS and stirring uniformity, are strict.

Examples of the polydimethylsiloxane having silanol groups at both ends, which is synthesized using anion living polymerization, include FM9926 (representative value: Mn=20,000, Mw/Mn=1.10; Mn=18,000 to 23,000, Mw/Mn=1.05 to 1.18 due to variations among lots), FM9927 (representative value: Mn=32,000, Mw/Mn=1.09; Mn=29,000 to 37,000, Mw/Mn=1.06 to 1.25 due to variations among lots), and FM9928 (representative value:

Mn=47,000, Mw/Mn=1.11; Mn=45,000 to 48,000, Mw/Mn=1.10 to 1.35 due to variations among lots) which are manufactured by JNC CORPORATION. Particularly, FM9927 is preferred for use at a high temperature of 250° C. or higher. The Mn and Mw/Mn of each of FM9926, FM9927, and FM9928 generally vary among lots within the above ranges respectively, but the variations within the above ranges do not cause great differences in the physical properties of the resulting phenyl-modified hybrid prepolymer (A), further the phenyl-modified polydimethylsiloxane-based hybrid prepolymer (C) and the solidified body.

It is to be noted that even when PDMS having a distribution index of molecular weight of larger than 1.4 is used, it is possible to prepare the phenyl-modified hybrid prepolymer (A). In this case, there is a fear that a deterioration in properties, such as a reduction in heat resistance or an increase in solidification temperature, occurs. However, PDMS that is not limited in a distribution index of molecular weight is versatile and easily available, and therefore its supply stability is improved. Examples of such PDMS include XF3905 and YF3057 manufactured by Momentive Performance Materials Inc.

[Polydimethylsiloxane Having Trialkoxysilyl Groups at Both Ends (PDMS-2)]

PDMS used as a raw material of a phenyl-modified hybrid prepolymer (B) that develops surface releasability is polydimethylsiloxane having trialkoxysilyl groups at both ends (PDMS-2), and is preferably represented by the following general formula (2).

[Chemical Formula 2]

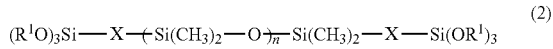

$$(R^1O)_3Si-X-(Si(CH_3)_2-O)_{\overline{n}}-Si(CH_3)_2-X-Si(OR^1)_3 \quad (2)$$

wherein $R^1$ is an alkyl group having 1 to 3 carbon atoms and selected from a methyl group, an ethyl group, an n-propyl group, and an isopropyl group, all $R^1$s may be the same or some or all of $R^1$s may be different, $R^1$ is most preferably an ethyl group in terms of reactivity, safety, and reaction control, X is oxygen or an alkylene group having 2 or less carbon atoms, and Xs may be the same or different.

By allowing the polydimethylsiloxane to have trialkoxysilyl groups at both ends, it is possible to increase the number of reaction points with diphenyldialkoxysilane poor in reactivity due to steric hindrance or a partial hydrolysate or condensate thereof to achieve a desired high condensation reaction rate. This raw material also preferably has a narrow molecular weight distribution as in the case of the polydimethylsiloxane having silanol groups at both ends. This kind of PDMS having a narrow molecular weight distribution can also be synthesized by applying living anion polymerization. The distribution index of molecular weight (Mw/Mn) of the polydimethylsiloxane having trialkoxysilyl groups at both ends is preferably 1.3 or less, more preferably 1.2 or less, even more preferably 1.1 or less. When the polydimethylsiloxane having trialkoxysilyl groups at both ends has a distribution index of molecular weight (Mw/Mn) of 1.3 or less, further 1.2 or less, phenyl modification reaction easily proceeds, and there is no fear that poor solidification occurs. Further, a solidified body (gelled body) of a phenyl-modified polydimethylsiloxane-based hybrid prepolymer (C) that will be described later can maintain heat resistance over a long period of time. Further, when the polydimethylsiloxane having trialkoxysilyl groups at both ends has a distribution index of molecular weight (Mw/Mn) of 1.1 or less, a solidified body (gelled body) is obtained which is particularly excellent in heat resistance-maintaining properties at a high temperature of 200° C. or higher. If the distribution index of molecular weight (Mw/Mn) is larger than 1.3, there is a fear that phenyl modification reaction poorly proceeds due to a high ratio of a low-molecular weight component or a high-molecular weight component or poor solidification occurs during solidification due to a large amount of an unreacted component. It is to be noted that some or all of alkoxy groups of the polydimethylsiloxane having trialkoxysilyl groups at both ends may be hydrolyzed during the reaction so that silanol groups are formed.

Further, the polydimethylsiloxane (PDMS-2) as a raw material of the phenyl-modified hybrid prepolymer (B) preferably has a number-average molecular weight (Mn) of 3,000 to 30,000. When the number-average molecular weight (Mn) is 3,000 or more, the heat resistance of the solidified body can be improved, and shrinkage of the solidified body can be suppressed, which makes it easy to perform molding. Further, when the number-average molecular weight (Mn) is 30,000 or less, hardness can be increased and tackiness can be reduced. If the number-average molecular weight (Mn) is less than 3,000, there is a fear that the heat resistance of the solidified body is reduced and the solidified body greatly shrinks, which makes it difficult to perform molding. On the other hand, if the number-average molecular weight (Mn) exceeds 30,000, there is a fear that the phenyl-modified hybrid prepolymer (B) also has tackiness caused by a reduction in hardness unique to polymer so that the tackiness of the phenyl-modified polydimethylsiloxane-based hybrid prepolymer (C) and the solidified body cannot be controlled. In consideration of heat resistance-maintaining properties, shrinkage ratio, tackiness, etc., the number-average molecular weight is more preferably about 5,000 to 28,000, even more preferably 12,000 to 25,000, most preferably 18,000 to 23,000.

Examples of the polydimethylsiloxane having trialkoxysilyl groups at both ends, which is synthesized using anion living polymerization, include FM8813 (representative value: Mn=3,000, Mw/Mn=1.10; Mn=2,950 to 3,100, Mw/Mn=1.05 to 1.15 due to variations among lots), FM8821 (representative value: Mn=6,000, Mw/Mn=1.10; Mn=5,900 to 6,200, Mw/Mn=1.06 to 1.16 due to variations among lots), FM8825 (representative value: Mn=10,000, Mw/Mn=1.10; Mn=10,000 to 13,500, Mw/Mn=1.06 to 1.18 due to variations among lots), and FM8826 (representative value: Mn=20,000, Mw/Mn=1.06; Mn=19,000 to 23,000, Mw/Mn=1.06 to 1.18 due to variations among lots) which are manufactured by JNC CORPORATION. Particularly, FM8826 is preferred for use at a high temperature of 250° C. or higher. The Mn and Mw/Mn of each of FM8813, FM8821, FM8825, and FM8826 generally vary among lots within the above ranges respectively, but the variations within the above ranges do not cause great differences in the physical properties of the resulting phenyl-modified hybrid prepolymer (B), further the phenyl-modified polydimethylsiloxane-based hybrid prepolymer (C) and the solidified body.

<Measurement of Average Molecular Weight>

The average molecular weights of PDMS-1 and PDMS-2 were measured by gel-permeation chromatography (GPC), and the ratio of weight-average molecular weight (Mw) to number-average molecular weight (Mn) was defined as the distribution index of molecular weight. Polystyrene was used as a reference material, and a molecular weight in terms of polystyrene was measured.

It is to be noted that the measurement of a molecular weight in terms of polystyrene by GPC is performed under the following measurement conditions.

a) Measurement instrument: SIC Autosampler Model 09
Sugai U-620 COLUMN HEATER
Uniflows UF-3005S2B2
b) Detector: MILLIPORE Waters 410
Differential Refractometer
c) Column: Shodex KF806M×2
d) Oven temperature: 40° C.
e) Eluent: Tetrahydrofuran (THF) 1.0 mL/min
f) Reference material: Polystyrene
g) Injected amount: 100 μL
h) Concentration: 0.020 g/10 mL
i) Sample preparation: Using THF containing 0.2% by weight of 2,6-di-tert-butyl-p-phenol (BHT) as a solvent, a sample was dissolved by stirring at room temperature.
j) Correction: The difference of a BHT peak between calibration curve measurement and sample measurement was corrected to calculate a molecular weight.

<Phenylalkoxysilane>

Phenylalkoxysilane used as a raw material to perform phenyl modification in the present invention is alkoxysilane having one or two phenyl groups in its molecule. An alkoxy group is hydrolyzed to a silanol group so that the phenylalkoxysilane is condensed with the PDMS or the modified PDMS by dealcoholization reaction or dehydration reaction. The alkoxy group is not limited, but is generally one having 1 to 3 carbon atoms and particularly preferably a methoxy group or an ethoxy group.

Phenyltrialkoxysilane has one phenyl group in its molecule, and phenyltrimethoxysilane having high reactivity is preferably used in terms of reactivity, but phenyltriethoxysilane having ethoxy groups is preferably used in terms of stability or safety (prevention of methanol generation). Phenyltrimethoxysilane may, of course, be used when there is no problem with an exhaust environment etc. It is to be noted that a phenyltrialkoxysilane oligomer is not commercially available and is difficult to obtain, but the same or higher effect can be obtained by using a phenyltrialkoxysilane oligomer.

Diphenyldialkoxysilane having two phenyl groups in its molecule used to prepare the phenyl-modified hybrid prepolymer (B) generally has low reactivity. Therefore, diphenyldimethoxysilane having methoxy groups is preferably used because it is less likely to be affected by steric hindrance by phenyl groups than diphenyldiethoxysilane and is therefore superior in reactivity. Diphenyldiethoxysilane may also be used, but is significantly poor in reactivity due to steric hindrance. For this reason, diphenyldimethoxysilane having higher reactivity is preferably used although it has a problem with safety. It is to be noted that a diphenyldialkoxysilane oligomer is not commercially available and is difficult to obtain, but the same or higher effect can be obtained by using a diphenyldialkoxysilane oligomer.

In the present invention, when the phenyl-modified hybrid prepolymer (A) or (B) is synthesized, it is important that a phenyl group is not one that is present as a replacement for a methyl group directly bonded to Si of the PDMS-1 or the PDMS-2 but is one that is present in a phenylalkoxysilane structure. A phenyl group-containing compound, especially a silicon-based compound is generally excellent in heat resistance. However, the molecular structure of the phenyl-modified hybrid prepolymer (A) or (B) of the present invention has the effect of not only improving the heat resistance of a phenylalkoxysilane-derived moiety but also suppressing the thermal degradation of a PDMS-derived moiety as a main chain skeleton and improving the heat resistance of the PDMS-derived moiety. The above-described molecular structure of the phenyl-modified hybrid prepolymer (A) or (B) is an essential structure for a heat-conducting sheet required to have heat-resistant properties. However, the hardness of a solidified body after solidification is increased when a phenyl group is present in the main chain skeleton of PDMS-1 or PDMS-2, and therefore the properties of a solidified body as an elastic body are significantly impaired. For this reason, alkoxysilane having a phenyl group is bonded to the end of PDMS as a main chain skeleton. This makes it possible to finally produce a phenyl-modified polydimethylsiloxane-based hybrid polymer having both flexibility and heat resistance.

<Phenyl-Modified Hybrid Prepolymers (A) and (B)>

[Production of Phenyl-Modified Hybrid Prepolymer Sol]

In the present invention, the phenyl-modified hybrid prepolymers (A) and (B) are prepared by condensation reaction between the PDMS-1 and the phenyltrialkoxysilane and by partial or complete hydrolysis and condensation reaction among the PDMS-2, the phenyltrialkoxysilane, and the diphenyldialkoxysilane, respectively. The condensation reaction usually uses an organometallic catalyst or a metal alkoxide-based catalyst. As the organometallic catalyst, an organic tin compound such as dibutyltin dilaurate or dibutyltin di-2-ethyl hexoate or a bismuth-, zinc-, or zirconium-based organometallic compound is often used. Further, an organometallic alkoxide condensation catalyst such as an organic titanium compound, e.g., tetra(2-ethylhexyl) titanate, or an acid catalyst such as hydrochloric acid or an alkali catalyst such as ammonia for the purpose of hydrolysis is sometimes used. However, in an environment requiring heat resistance, especially an usage environment at 250° C. or higher, many of organometallic catalysts may function as a negative catalyst, and are likely to develop the effect of deteriorating heat-resistant properties such as the effect of cleaving a polymer molecular structure. For this reason, it is difficult to easily use the above catalysts as catalysts for synthesizing the hybrid prepolymer or for obtaining a solidified body from the hybrid prepolymer.

However, a Ti-based alkoxide is superior in terms of heat-resistant properties because when a Ti-based alkoxide is used, the above-described catalytic effect of accelerating thermal degradation after solidification is not developed. Alternatively, a Zr-based catalyst or an Al-based catalyst may also be used.

The reaction between the polydimethylsiloxane (PDMS-1) having silanol groups at both ends and the phenyltrialkoxysilane preferably uses a titanium alkoxide compound as a catalyst. The above-described organometallic compound may be used, but a Ti-based catalyst having a low negative catalytic effect is preferred in consideration of heat-resistant applications. Examples of the Ti-based (Ti alkoxide) catalyst include tetra(2-ethylhexyl) titanate, titanium tetra-n-butoxide, titanium tetra-isopropoxide, titanium diisopropoxy bis(ethyl acetoacetate), titanium tetra acetyl acetonate, titanium di-2-ethylhexoxy bis(2-ethyl-4-hydroxyhexoxide), and titanium diisopropoxy bis(acetylacetonate). When the Ti-based catalyst is used, a sol is likely to be colored yellow or brownish yellow during the reaction. The use of a yellowish color for products tends to be avoided as a deteriorated color, and therefore tetra(2-ethylhexyl) titanate is particularly preferably used because a sol is less likely to be colored.

The titanium alkoxide is preferably used in an amount of 0.08 to 0.2 mol per 1 mol of the polydimethylsiloxane having silanol groups at both ends. If the amount is less than 0.08 mol, there is a fear that solidification does not occur, and even if the amount exceeds 0.2 mol, the effect is not enhanced in proportion to the amount. The amount of the titanium alkoxide to be added is more preferably 0.09 to 0.15 mol per 1 mol of the polydimethylsiloxane having silanol groups at both ends.

Similarly to the above, the reaction among the polydimethylsiloxane having trialkoxysilyl groups at both ends (PDMS-2), the phenyltrialkoxysilane, and the diphenyldialkoxysilane preferably uses a titanium alkoxide compound as a catalyst. The above-described organometallic compound may be used, but similarly to the above, a Ti-based catalyst having a low negative catalytic effect is preferred in consideration of heat-resistant applications. Examples of the Ti-based (Ti alkoxide) catalyst include those mentioned above, and tetra(2-ethylhexyl) titanate is preferably used for the same reason as the above.

The titanium alkoxide is preferably used in an amount of 0.08 to 0.2 mol per 1 mol of the polydimethylsiloxane having trialkoxysilyl groups at both ends. If the amount is less than 0.08 mol, there is a fear that solidification does not occur, and even if the amount exceeds 0.2 mol, the effect is not enhanced in proportion to the amount. The amount of the titanium alkoxide to be added is more preferably 0.09 to 0.15 mol per 1 mol of the polydimethylsiloxane having trialkoxysilyl groups at both ends.

When the condensation reaction is performed, in order to stably perform hydrolysis, dehydration, and dealcoholization reaction of the PDMS, the phenyltriethoxysilane, and the diphenyldialkoxysilane, a vessel used for reaction is preferably filled with an inert gas. Examples of the inert gas include nitrogen gas and Group 18 elements (such as helium, neon, argon, krypton, xenon, etc.) as rare gases. Alternatively, a mixture of two or more of these gases may be used. The method of hydrolysis may be selected from various methods such as dropping or spraying of an appropriate amount of water and introduction of water vapor. The amount of water to be introduced may be appropriately adjusted in consideration of difference in reactivity depending on the kind of alkoxysilane monomer used. The alkoxy groups of the phenylalkoxysilane or the diphenyldialkoxysilane are hydrolyzed to silanol groups, and heating in the presence of an inert gas causes condensation reaction between the silanol groups or the some remaining alkoxy groups and silanol groups or trialkoxysilyl groups at both ends of the PDMS. For example, condensation reaction between PDMS having a sufficiently small distribution index of molecular weight (Mw/Mn) and phenyl group-containing alkoxysilane is stabilized by making a reaction temperature and the amount of water contained in an inert gas atmosphere constant, which makes it possible to quickly complete the reaction at a relatively low temperature. It is to be noted that in order to more stabilize the reaction, a reflux condenser or the like is preferably attached in the initial stage of synthesis to perform the reaction for a given length of time.

[Mixing Ratio]

The mixing ratio between the polydimethylsiloxane having silanol groups at both ends (PDMS-1) and the phenyltrialkoxysilane (Ph-1) is preferably a molar ratio of 1 mol (PDMS-1):0.5 to 5 mol (Ph-1). When the molar ratio is within the above range, condensation reaction is smoothly performed. However, if the amount of (Ph-1) is too large, there is a fear that flexibility is impaired, and on the other hand, if the amount of (Ph-1) is too small, heat resistance-maintaining properties are deteriorated and finally solidification poorly occurs. The mixing ratio is more preferably a molar ratio of 1 mol (PDMS-1):1 to 4 mol (Ph-1).

The mixing ratio among the polydimethylsiloxane having trialkoxysilyl groups at both ends (PDMS-2), the phenyltrialkoxysilane (Ph-1), and the diphenyldialkoxysilane (Ph-2) is preferably a molar ratio of 1 mol (PDMS-2):0.5 to 3 mol (Ph-1):0.5 to 3 mol (Ph-2). When the molar ratio is within the above range, condensation reaction is smoothly performed. However, if the amounts of (Ph-1) and (Ph-2) are too large, there is a fear that flexibility is impaired, and on the other hand, if the amounts of (Ph-1) and (Ph-2) are too small, heat resistance-maintaining properties are deteriorated and finally solidification poorly occurs. The mixing ratio is more preferably a molar ratio of 1 mol (PDMS-2):1 to 2 mol (Ph-1):1 to 2 mol (Ph-2).

It is to be noted that the term "molar ratio" used herein refers to a molar ratio calculated based on the number-average molecular weight (Mn) of the PDMS (PDMS-1 or PDMS-2) measured by gel permeation chromatography (GPC) using polystyrene as a reference material and tetrahydrofuran as an eluent and the molecular weights of the phenyltrialkoxysilane (Ph-1) and the diphenyldialkoxysilane (Ph-2).

[Method for Preparing Phenyl-Modified Hybrid Prepolymer (A) or (B)]

The phenyl-modified hybrid prepolymer (A) or (B) is prepared (synthesized) using a reactor (flask having two or more inlets) equipped with a stirrer, a thermometer, and a dropping means. When the synthesis is more precisely performed, a reflux apparatus is preferably attached. The stirrer is not particularly limited as long as the effect of homogeneously mixing high-viscosity liquid raw materials that contribute to reaction can be obtained, and may be, for example, a rotary stirrer equipped with a stirring blade, a magnetic stirrer, a biaxial planetary stirrer, or an ultrasonic washing machine. However, a rotary stirrer, a magnetic stirrer, or the like is preferred in terms of temperature control, atmosphere control, and attachment of a component dropping means. It is important that a synthesis temperature be uniform. Therefore, when a synthesis volume is small, a simple means such as a hot plate is enough. However, a mass-production line for larger than 5 L preferably uses a heating means, such as a mantle heater, excellent in thermal insulating properties and homogeneity. The synthesis temperature is appropriately set to fall within the range of 60 to 100° C. The synthesis temperature is set on a case-by-case basis depending on the types of raw materials, the mixing ratio, synthesis equipment, etc. because there is a case where the reaction is performed at low temperature for a long time or the synthesis is performed at high temperature for a short time. An inert gas, such as nitrogen gas, is used as a synthesis atmosphere, and the reactor is sufficiently filled with nitrogen gas whose moisture content is maintained constant. At this time, the nitrogen gas is preferably produced using a nitrogen gas production apparatus. Nitrogen gas supplied from a cylinder or nitrogen gas produced from liquid nitrogen can, of course, be supplied, but a nitrogen gas production apparatus whose supply pressure is less likely to vary is preferably used because there is a case where it takes a long time to complete the synthesis.

The thus prepared phenyl-modified hybrid prepolymer (A) or (B) contains at least any one of the following structural units. Hereinbelow, a phenyl-modified hybrid prepolymer containing a certain structural unit includes a phenyl-modified hybrid prepolymer obtained by condensation of two or more certain structural units accompanied by dehydration or dealcoholization. More specifically, when two or more structural units or a structural unit and polydimethylsiloxane as a raw material compound are bonded together by dehydration or dealcoholization condensation to form a condensate, Si—OR$^1$, Si—OR$^2$, M$^1$-OR, or M$^2$-OR at the end of each structural unit is changed to Si—O—Si, Si—O—M$^1$, Si—O—M$^2$, or M$^1$-O-M$^2$, but such a condensate is also included in the phenyl-modified hybrid prepolymers (A) and (B) containing any one of the following structural units. It is to be noted that M$^1$ and M$^2$ derived from a condensation catalyst is sometimes introduced into a molecular structure but sometimes not.

The phenyl-modified hybrid prepolymer (B) is, for example, a phenyl-modified hybrid prepolymer (B) containing a structural unit represented by the following formula (Ia) or (Ib):

[Chemical Formula 3]

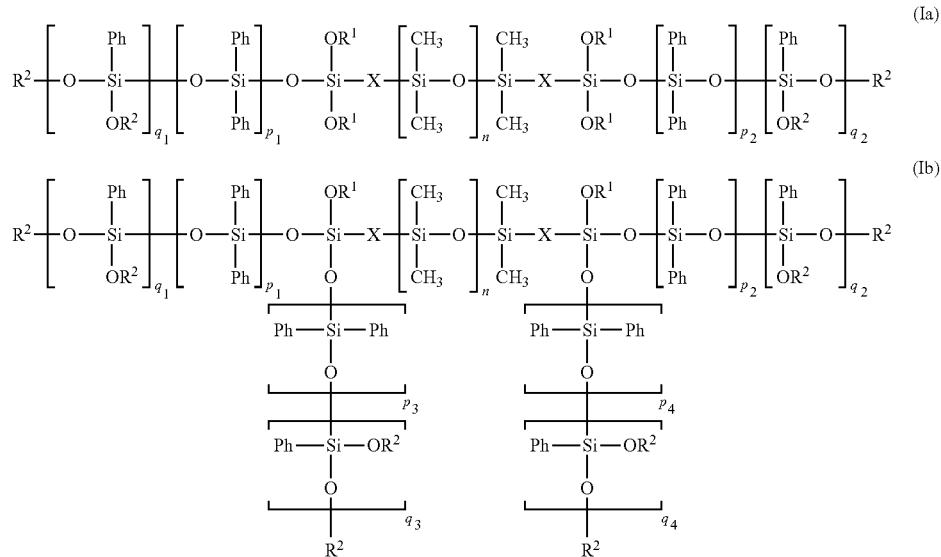

wherein $R^1$ and $R^2$ are each an alkyl group having 1 to 3 carbon atoms or H ($R^1$ and $R^2$ may be the same or different, two or more $R^1$s may be all the same or different from each other, and two or more $R^2$s may be all the same or different from each other); Ph is a phenyl group; X is oxygen or an alkylene group having 2 or less carbon atoms; n is a positive integer; $p_1=0$, 1, or 2 and $p_2=0$, 1, or 2 wherein $p_1+p_2\geq1$; $q_1=0$, 1, or 2 and $q_2=0$, 1, or 2 wherein $q_1+q_2\geq1$; $p_3=0$ or 1 and $p_4=0$ or 1 wherein $p_1\geq p_3$ and $p_2\geq p_4$; $q_3=0$, 1, or 2 and $q_4=0$, 1, or 2. It is to be noted that the phenyl-modified hybrid prepolymer (B) preferably contains a structural unit represented by the formula (Ia).

Further, the phenyl-modified hybrid prepolymer (B) is, for example, a phenyl-modified hybrid prepolymer (B) containing a structural unit represented by any one of the following formulas (Ic), (Id), (Ie), (Ic'), (Id'), and (Ie'):

[Chemical Formula 4]

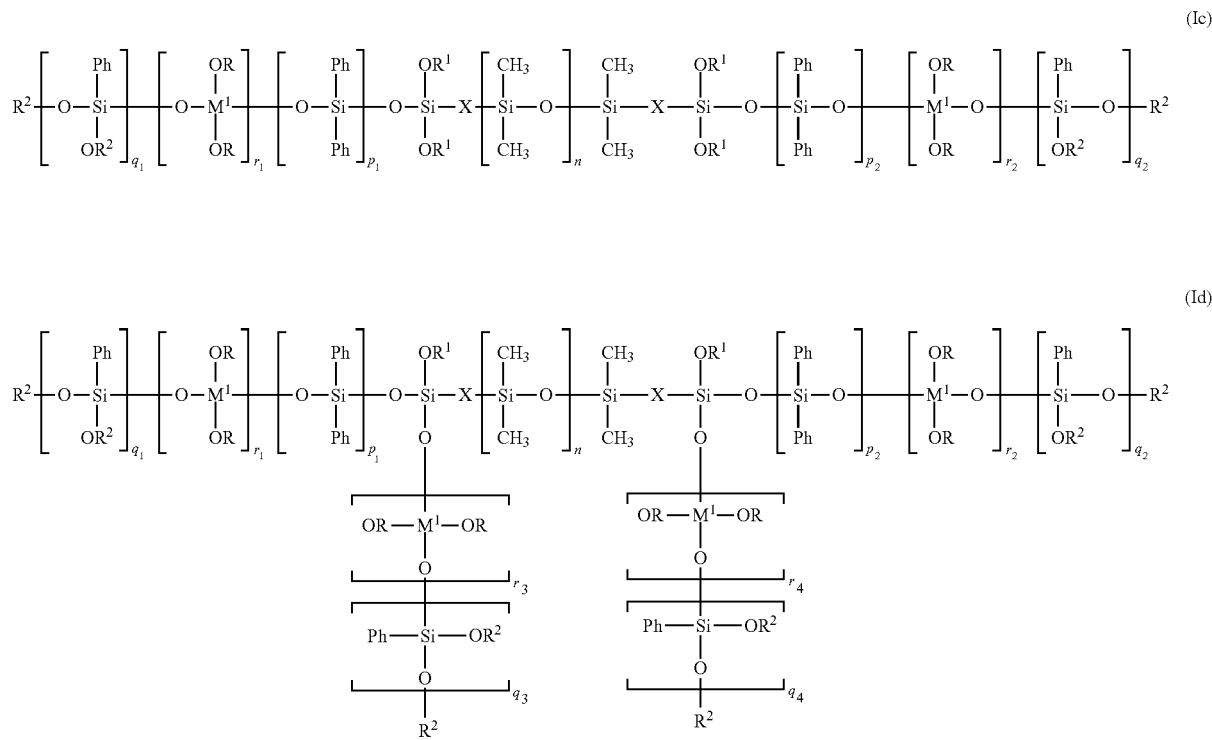

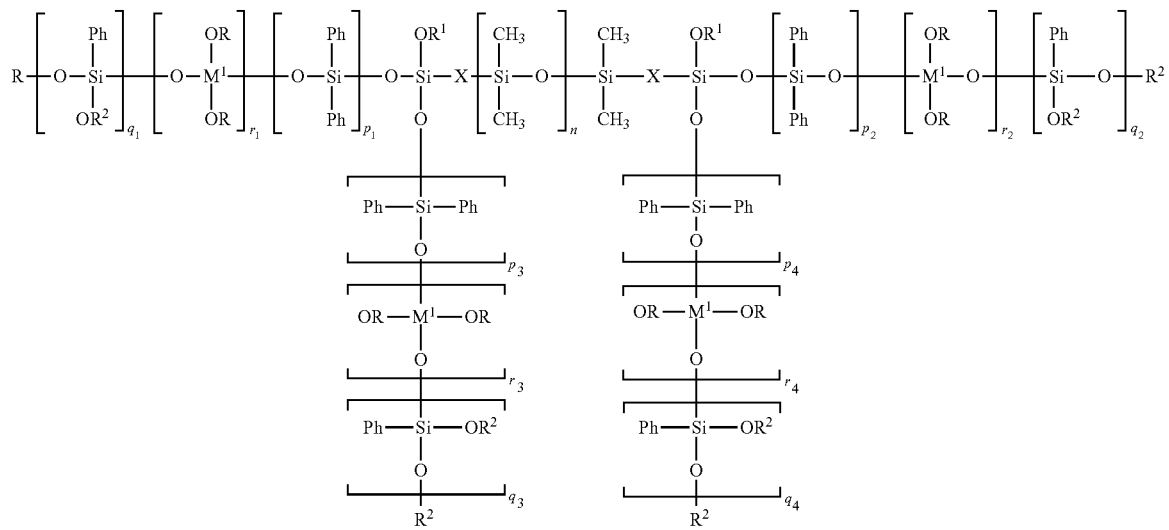
(Ie)
[Chemical Formula 5]
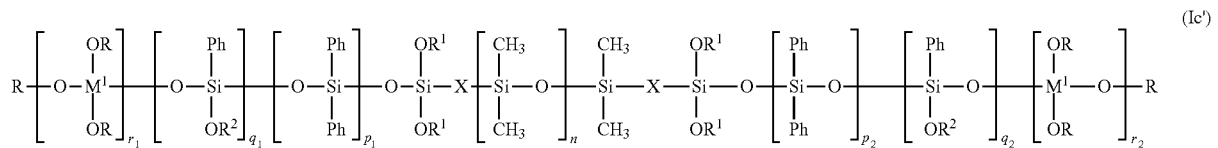
(Ic′)
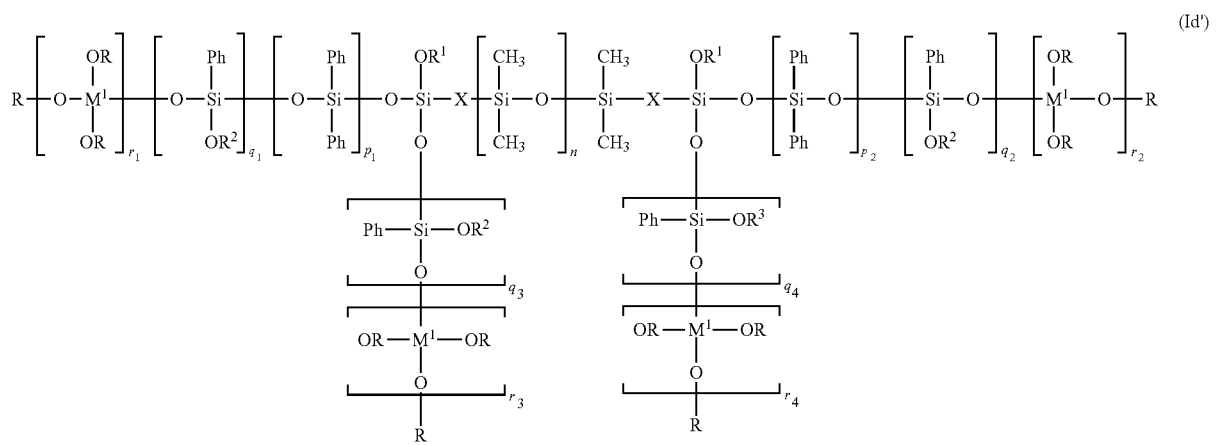
(Id′)

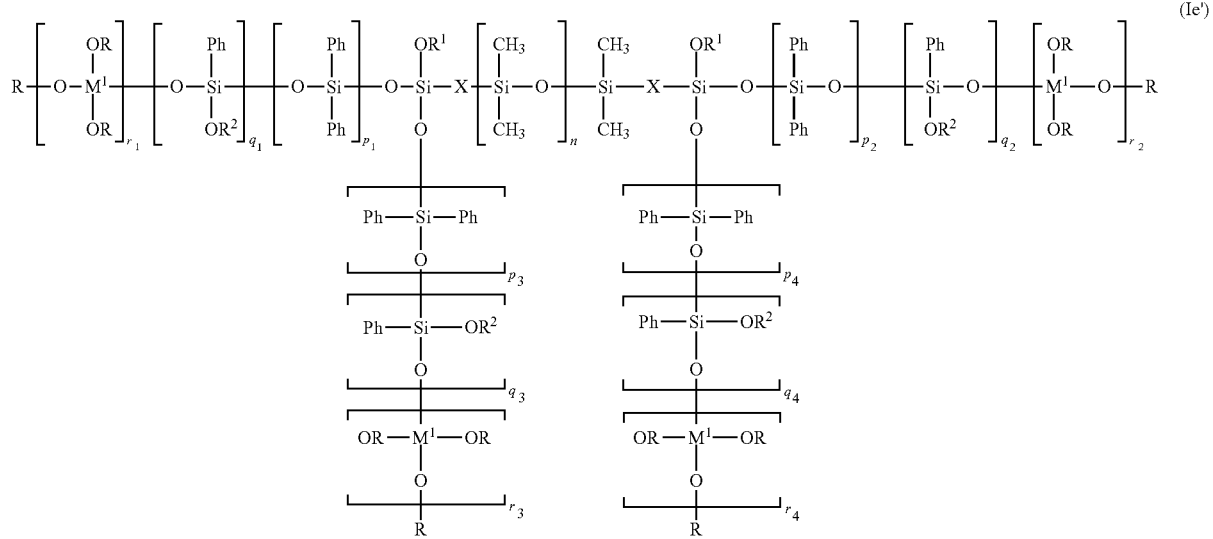

(Ie')

wherein $R^1$ and $R^2$ are each an alkyl group having 1 to 3 carbon atoms or H ($R^1$ and $R^2$ may be the same or different, two or more $R^1$s may be all the same or different from each other, and two or more $R^2$s may be all the same or different from each other); R is an alkyl group having 3 to 8 carbon atoms or H (two or more Rs may be all the same or different from each other); Ph is a phenyl group; X is oxygen or an alkylene group having 2 or less carbon atoms; $M^1$ is Ti or Zr; n is a positive integer; $p_1=0$, 1, or 2 and $p_2=0$, 1, or 2 wherein $p_1+p_2\geq 1$; $q_1=0$, 1, or 2 and $q_2=0$, 1, or 2 wherein $q_1+q_2\geq 1$; $p_3=0$ or 1 and $p_4=0$ or 1 wherein $p_1\geq p_3$ and $p_2\geq p_4$; $q_3=0$, 1, or 2 and $q_4=0$, 1, or 2; and $r_1=0$ or 1, $r_2=0$ or 1, $r_3=0$ or 1, and $r_4=0$ or 1 wherein $r_1+r_2+r_3+r_4\leq 2$.

Further, the phenyl-modified hybrid prepolymer (B) is, for example, a phenyl-modified hybrid prepolymer (B) containing a structural unit represented by any one of the following formulas (If), (Ig), (Ih), (If'), (Ig'), and (Ih'):

[Chemical Formula 6]

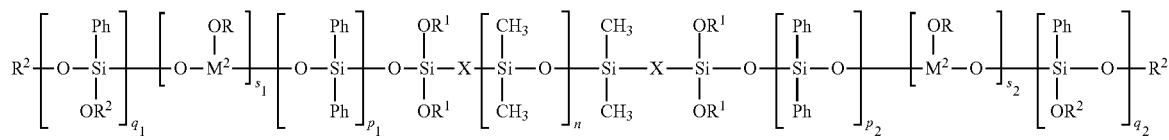

(If)

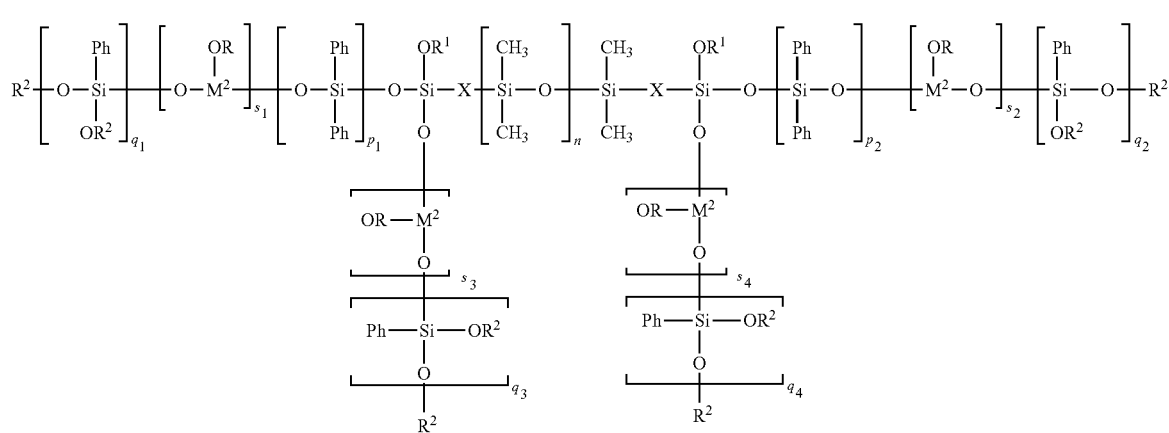

(Ig)

(Ih)
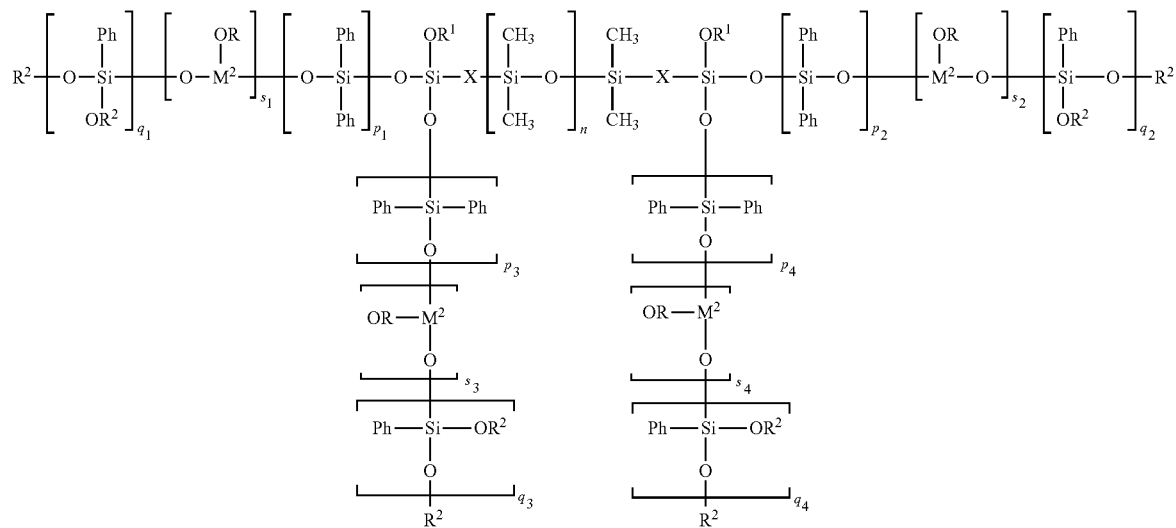
[Chemical Formula 7]
(If')
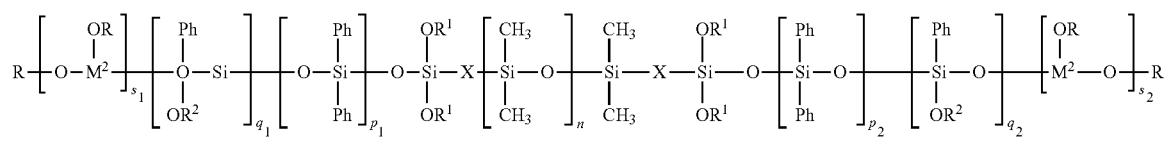
(Ig')
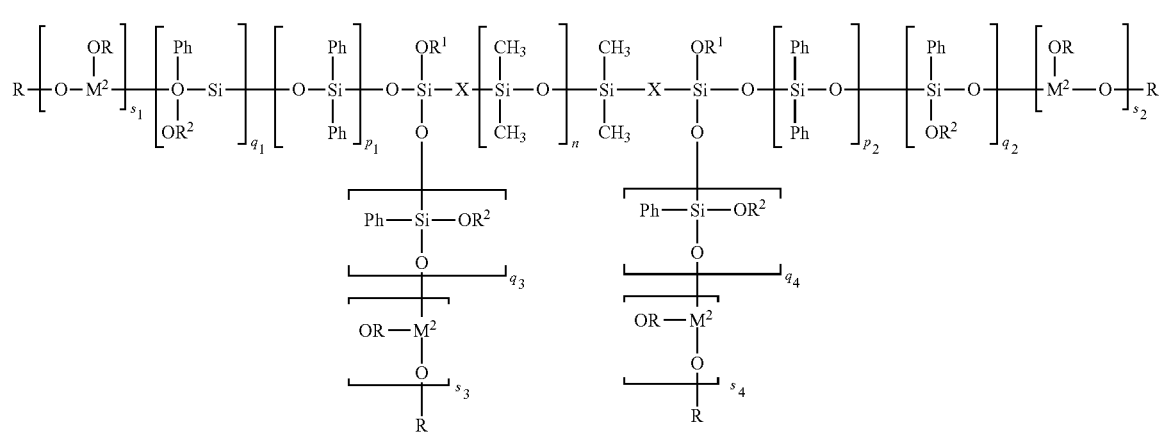

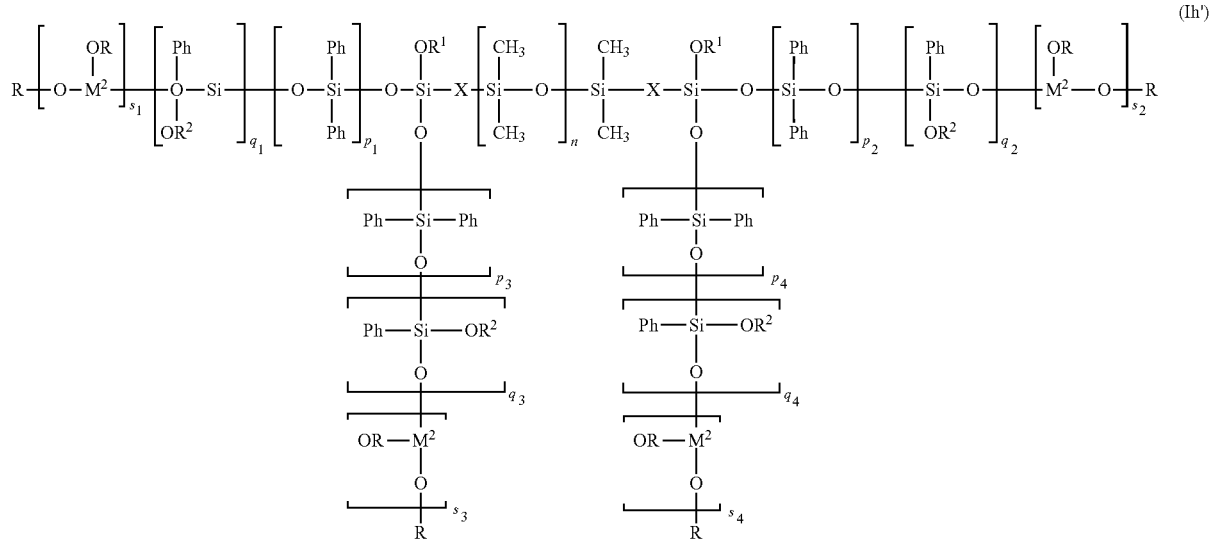

wherein $R^1$ and $R^2$ are each an alkyl group having 1 to 3 carbon atoms or H ($R^1$ and $R^2$ may be the same or different, two or more $R^1$s may be all the same or different from each other, and two or more $R^2$s may be all the same or different from each other); R is an alkyl group having 3 to 8 carbon atoms or H (two or more Rs may be all the same or different from each other); Ph is a phenyl group; X is oxygen or an alkylene group having 2 or less carbon atoms; $M^2$ is Al; n is a positive integer; $p_1=0$, 1, or 2 and $p_2=0$, 1, or 2 wherein $p_1+p_2\geq 1$; $q_1=0$, 1, or 2 and $q_2=0$, 1, or 2 wherein $q_1+q_2\geq 1$; $p_3=0$ or 1 and $p_4=0$ or 1 wherein $p_1\geq p_3$ and $p_2\geq p_4$; $q_3=0$, 1, or 2 and $q_4=0$, 1, or 2; and $s_1=0$ or 1, $s_2=0$ or 1, $s_3=0$ or 1, and $s_4=0$ or 1 wherein $s_1+s_2+s_3+s_4\leq 2$.

Further, the phenyl-modified hybrid prepolymer (A) is, for example, a phenyl-modified hybrid prepolymer (A) containing a structural unit represented by the following formula (IIa) or (IIb):

[Chemical Formula 8]

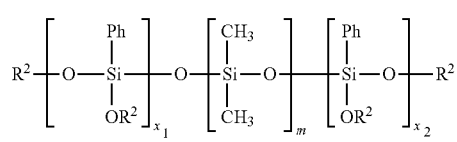
(IIa)

[Chemical Formula 9]

(IIb)

wherein $R^2$ is an alkyl group having 1 to 3 carbon atoms or H (two or more $R^2$s may be all the same or different from each other); Ph is a phenyl group; m is a positive integer; and $x_1=0$, 1, 2, or 3, $x_2=0$, 1, 2, or 3, $x_3=0$, 1, or 2, $x_4=0$, 1, or 2, $x_5=0$, 1, or 2, and $x_6=0$, 1, or 2 wherein $x_1+x_2\geq 1$, $x_3+x_4\geq 1$, $x_3\geq x_5$, and $x_4\geq x_6$. It is to be noted that the phenyl-modified hybrid prepolymer (A) preferably contains a structural unit represented by the formula (IIa).

Further, the phenyl-modified hybrid prepolymer (A) is, for example, a phenyl-modified hybrid prepolymer (A) containing a structural unit represented by any one of the following formulas (IIc), (IId), (IIc'), and (IId'):

(IIc)

-continued

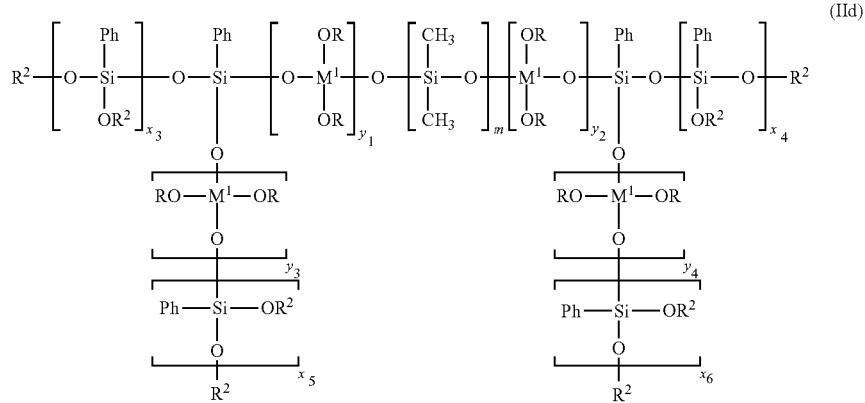
(IId)

[Chemical Formula 10]

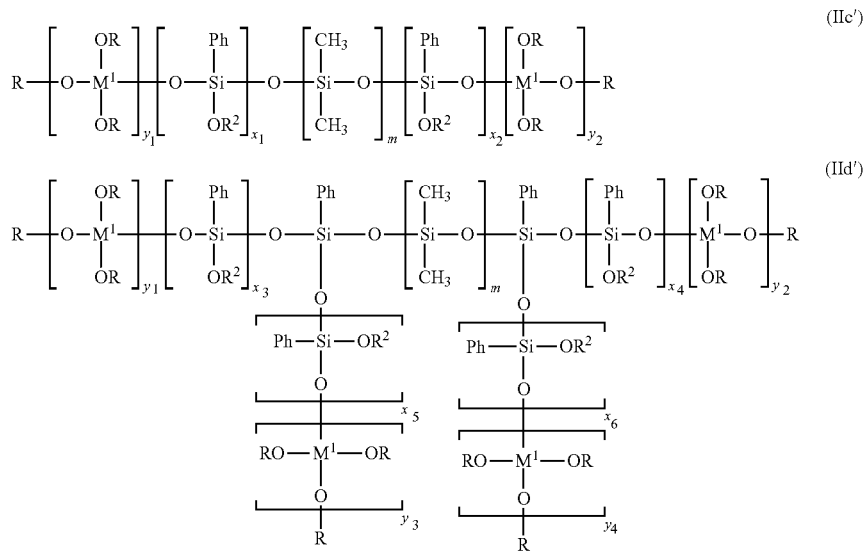
(IIc′)

(IId′)

wherein $R^2$ is an alkyl group having 1 to 3 carbon atoms or H (two or more $R^2$s may be all the same or different from each other); R is an alkyl group having 3 to 8 carbon atoms or H (two or more Rs may be all the same or different from each other); Ph is a phenyl group; $M^1$ is Ti or Zr; m is a positive integer; $x_1=0$, 1, 2, or 3, $x_2=0$, 1, 2, or 3, $x_3=0$, 1, or 2, $x_4=0$, 1, or 2, $x_5=0$, 1, or 2, and $x_6=0$, 1, or 2 wherein $x_1+x_2\geq 1$, $x_3+x_4\geq 1$, $x_3\geq x_5$, and $x_4\geq x_6$; and $y_1=0$ or 1, $y_2=0$ or 1, $y_3=0$ or 1, and $y_4=0$ or 1 wherein $y_1+y_2+y_3+y_4\leq 2$.

Further, the phenyl-modified hybrid prepolymer (A) is, for example, a phenyl-modified hybrid prepolymer (A) containing a structural unit represented by any one of the following formulas (IIe), (IIf), (IIe′), and (IIf′):

[Chemical Formula 11]

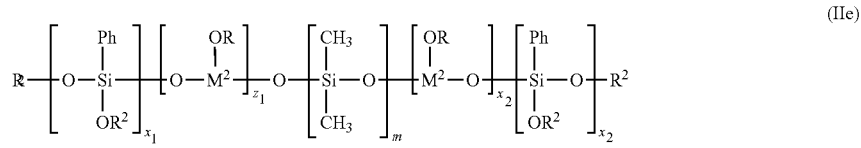
(IIe)

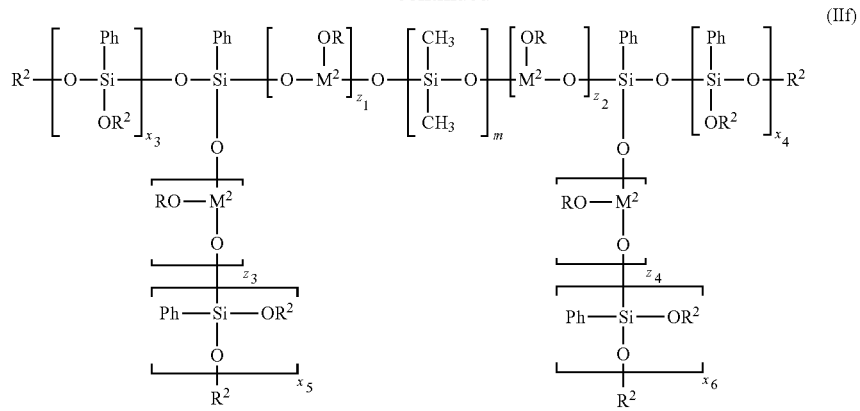

[Chemical Formula 12]

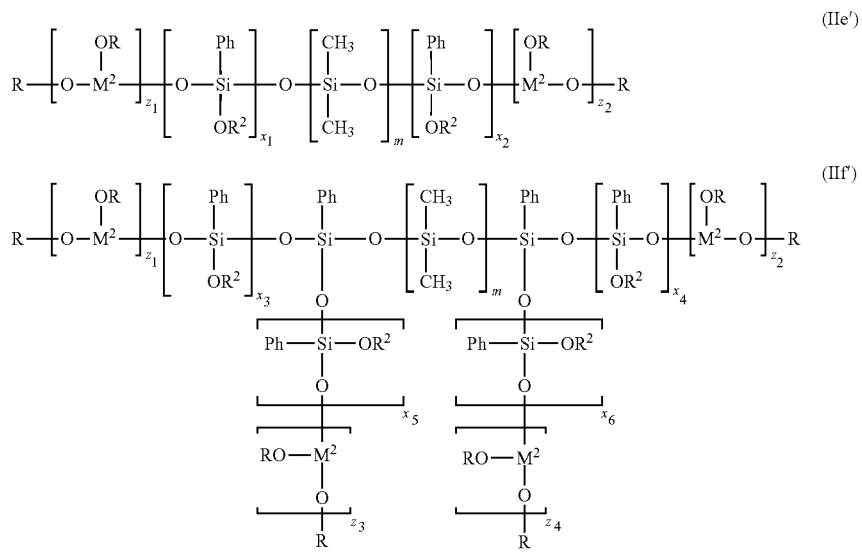

wherein $R^2$ is an alkyl group having 1 to 3 carbon atoms or H (two or more $R^2$s may be all the same or different from each other); R is an alkyl group having 3 to 8 carbon atoms or H (two or more Rs may be all the same or different from each other); Ph is a phenyl group; $M^2$ is Al; m is a positive integer; $x_1$=0, 1, 2, or 3, $x_2$=0, 1, 2, or 3, $x_3$=0, 1, or 2, $x_4$=0, 1, or 2, $x_5$=0, 1, or 2, and $x_6$=0, 1, or 2 wherein $x_1+x_2\geq 1$, $x_3+x_4\geq 1$, $x_3\geq x_5$, and $x_4\geq x_6$; and $z_1$=0 or 1, $z_2$=0 or 1, $z_3$=0 or 1, and $z_4$=0 or 1 wherein $z_1+z_2+z_3+z_4\leq 2$.

The phenyl-modified polydimethylsiloxane-based hybrid prepolymer (C) can be prepared by mixing the phenyl-modified hybrid prepolymer (A) and the phenyl-modified hybrid prepolymer (B) in any ratio. A mixing method is not limited, but an apparatus that is less likely to be affected by outside air, such as a biaxial planetary stirrer, is preferably used. The obtained phenyl-modified polydimethylsiloxane-based hybrid prepolymer (C) is turned into a solidified body through a heating step. A heating method is not limited, and a fan- or circulation-type electric furnace or an atmosphere furnace may be used.

<Solidification of Phenyl-Modified Polydimethylsiloxane-Based Hybrid Prepolymer (C)>

[Organometallic Compound]

In the present invention, the use of a metal compound catalyst is not preferred from the viewpoint of heat-resistant properties. However, a metal compound catalyst may be used depending on the intended use in a case where, for example, a resulting solidified body is not required to have heat resistance or is intended to be used at 180 to 200° C. without being exposed to the atmosphere. Many of metal compound catalysts are organometallic compounds, but the use of an organometallic compound catalyst as a solidification catalyst makes it possible to perform treatment at low temperature for a short period of time. At least one organometallic compound catalyst is selected from those usually used as a solidification agent of a PDMS-based material, such as Sn-, Ti-, Al-, Zn-, Zr-, and Bi-based organometallic compounds, metal alkoxides, and metal chelate compounds.

Examples of the organometallic compound include organic acid salts (especially, carboxylic acid salts), alkoxides, alkylmetal compounds, acetylacetonate complexes, ethyl acetoacetate complexes, and metal complexes of an alkoxide, which are prepared by substituting some alkoxy groups of a metal alkoxide with acetylacetonate or ethyl acetoacetate, of the above-mentioned metal alkoxides.

Specific examples of the organometallic compound include zinc octylate (zinc 2-ethylhexanoate), zirconium octylate (zirconium 2-ethylhexanoate), zirconyl octylate (zirconyl 2-ethylhexanoate), dibutyltin dilaurate, dibutyltin diacetate, dibutyltin bis(acetylacetonate), tetra(2-ethylhexyl) titanate, titanium tetra-n-butoxide, titanium tetraisopropoxide, titanium diisopropoxy bis(ethyl acetoacetate), titanium tetra-acetylacetonate, titanium di-2-ethylhexoxy bis(2-ethyl-3-hydroxyhexoxide), titanium diisopropoxy bis (acetylacetonate), zirconium tetra-n-propoxide, zirconium tetra-n-butoxide, zirconium tetra-acetylacetonate, zirconium tributoxy monoacetylacetonate, and zirconium dibutoxy bis (ethyl acetoacetate).

The mixing ratio of the organometallic compound catalyst to the phenyl-modified polydimethylsiloxane-based hybrid prepolymer (C) is usually preferably about 0.01 to 0.1 mol per 1 mol of (C). If the ratio of the organometallic compound catalyst is too low, a solidification temperature is not reduced, and a solidification time cannot be reduced, either. If the ratio of the organometallic compound catalyst is larger than the appropriate ratio, there is a fear that the organometallic compound catalyst is turned into an activated metal compound catalyst after solidification, which causes a lack of thermal stability.

EXAMPLES

The present invention will be described more specifically with reference to examples.

It is to be noted that "part(s)" and "%" in the examples are on the basis of mass (part(s) by mass, % by mass) unless otherwise specified.

The present invention is not limited to these examples.

Synthesis Example 1

[Preparation of Phenyl-Modified Hybrid Prepolymer (A-1) Sol]

A reactor equipped with a stirrer, a thermometer, and a dropping means was sufficiently filled with nitrogen gas. The nitrogen gas used at this time was produced by a nitrogen gas production apparatus (UNX-200 manufactured by Japan Unix Co., Ltd.).

First, 226.2 g of FM9927 manufactured by JNC CORPORATION (number-average molecular weight (Mn)=32,000, distribution index of molecular weight (Mw/Mn)=1.09) as polydimethylsiloxane having silanol groups at both ends (PDMS-1), 1.7 g of phenyl triethoxysilane (Ph-1; manufactured by Tokyo Chemical Industry Co., Ltd., molecular weight=240.37), and 0.40 g of tetra(2-ethylhexyl) titanate manufactured by Matsumoto Fine Chemical Co., Ltd. (ORGATIX TA-30; molecular weight=564.75) were weighed, respectively and placed in the reactor sufficiently filled with the nitrogen gas in the order in which they are described above. The mixture was heated with stirring using a hot plate with a magnetic stirrer and kept stirred at a liquid temperature of 80° C. for 3 hours to prepare a phenyl-modified hybrid prepolymer (A-1) sol. During the reaction, the nitrogen gas was kept flowing.

The molar ratio between the PDMS-1 (FM9927) and the Ph-1 (phenyl triethoxysilane) is PDMS-1:Ph-1=1:1, and the molar ratio between the PDMS-1 (FM9927) and ORGATIX TA-30 is PDMS-1:TA-30=1:0.1.

Synthesis Example 2

[Preparation of Phenyl-Modified Hybrid Prepolymer (A-2) Sol]

A phenyl-modified hybrid prepolymer (A-2) sol was prepared in the same manner as in Synthesis Example 1 except that the following raw materials were used.

226.2 g of FM9927 manufactured by JNC CORPORATION (number-average molecular weight Mn=32,000, distribution index of molecular weight (Mw/Mn)=1.09) as polydimethylsiloxane having silanol groups at both ends (PDMS-1) 3.4 g of phenyl triethoxysilane (Ph-1; manufactured by Tokyo Chemical Industry Co., Ltd., molecular weight=240.37)

0.40 g of tetra(2-ethylhexyl) titanate manufactured by Matsumoto Fine Chemical Co., Ltd. (ORGATIX TA-30; molecular weight=564.75)

The molar ratio between the PDMS-1 (FM9927) and the Ph-1 (phenyl triethoxysilane) is PDMS-1:Ph-1=1:2, and the molar ratio between the PDMS-1 (FM9927) and ORGATIX TA-30 is PDMS-1:TA-30=1:0.1.

Synthesis Example 3

[Preparation of Phenyl-Modified Hybrid Prepolymer (A-3) Sol]

A phenyl-modified hybrid prepolymer (A-3) sol was prepared in the same manner as in Synthesis Example 1 except that the following raw materials were used.

226.2 g of FM9927 manufactured by JNC CORPORATION (number-average molecular weight (Mn)=32,000, distribution index of molecular weight (Mw/Mn)=1.09) as polydimethylsiloxane having silanol groups at both ends (PDMS-1) 6.8 g of phenyl triethoxysilane (Ph-1; manufactured by Tokyo Chemical Industry Co., Ltd., molecular weight=240.37)

0.40 g of tetra(2-ethylhexyl) titanate manufactured by Matsumoto Fine Chemical Co., Ltd. (ORGATIX TA-30; molecular weight=564.75)

The molar ratio between the PDMS-1 (FM9927) and the Ph-1 (phenyl triethoxysilane) is PDMS-1:Ph-1=1:4, and the molar ratio between the PDMS-1 (FM9927) and ORGATIX TA-30 is PDMS-1:TA-30=1:0.1.

Synthesis Example 4

[Preparation of Phenyl-Modified Hybrid Prepolymer (A-4) Sol]

A phenyl-modified hybrid prepolymer (A-4) sol was prepared in the same manner as in Synthesis Example 1 except that the following raw materials were used.

226.2 g of FM9927 manufactured by JNC CORPORATION (treated with an evaporator, number-average molecular weight Mn=44,000, distribution index of molecular weight (Mw/Mn)=1.37) as polydimethylsiloxane having silanol groups at both ends (PDMS-1)

3.4 g of phenyl triethoxysilane (Ph-1; manufactured by Tokyo Chemical Industry Co., Ltd., molecular weight=240.37)

0.40 g of tetra(2-ethylhexyl) titanate manufactured by Matsumoto Fine Chemical Co., Ltd. (ORGATIX TA-30; molecular weight=564.75)

The molar ratio between the PDMS-1 (FM9927) and the Ph-1 (phenyl triethoxysilane) is PDMS-1:Ph-1=1:2.8, and the molar ratio between the PDMS-1 (FM9927) and ORGATIX TA-30 is PDMS-1:TA-30=1:0.14.

Synthesis Example 5

[Preparation of Phenyl-Modified Hybrid Prepolymer (B-1) Sol]

A reactor equipped with a stirrer, a thermometer, and a dropping means was sufficiently filled with nitrogen gas. The nitrogen gas used at this time was produced by a nitrogen gas production apparatus (UNX-200 manufactured by Japan Unix Co., Ltd.).

First, 495.8 g of FM8826 manufactured by JNC CORPORATION (number-average molecular weight (Mn)=20,000, distribution index of molecular weight (Mw/Mn)=1.06) as polydimethylsiloxane having trialkoxysilyl groups at both ends (PDMS-2), 12.1 g of diphenyl dimethoxysilane (Ph-2; KBM-202SS manufactured by Shin-Etsu Chemical Co., Ltd., molecular weight=244.36), 35 g of water diluted 20-fold with ethanol, 11.9 g of phenyl triethoxysilane (Ph-1; manufactured by Tokyo Chemical Industry Co., Ltd., molecular weight=240.37), and 1.4 g of tetra(2-ethylhexyl) titanate manufactured by Matsumoto Fine Chemical Co., Ltd. (ORGATIX TA-30; molecular weight=564.75) were weighed, respectively and placed in the reactor sufficiently filled with the nitrogen gas in the order in which they are described above. The mixture was heated with stirring using a hot plate with a magnetic stirrer and was kept stirred at a liquid temperature of 80° C. for 10 hours to prepare a phenyl-modified hybrid prepolymer (B-1) sol. During the reaction, the nitrogen gas was kept flowing.

The molar ratio between the PDMS-2 (FM8826) and the Ph-1 (phenyl triethoxysilane) is PDMS-2:Ph-1=1:2, the molar ratio between the PDMS-2 (FM8826) and the Ph-2 (diphenyl dimethoxysilane) is 1:2, and the molar ratio between the PDMS-2 (FM8826) and ORGATIX TA-30 is PDMS-2:TA-30=1:0.1.

Synthesis Example 6

[Preparation of Phenyl-Modified Hybrid Prepolymer (B-2) Sol]

A phenyl-modified hybrid prepolymer (B-2) sol was prepared in the same manner as in Synthesis Example 5 except that the following raw materials were used.

495.8 g of FM8826 manufactured by JNC CORPORATION (number-average molecular weight (Mn)=20,000, distribution index of molecular weight (Mw/Mn)=1.06) as polydimethylsiloxane having trialkoxysilyl groups at both ends (PDMS-2)

6.1 g of diphenyl dimethoxysilane (Ph-2; KBM-202SS manufactured by Shin-Etsu Chemical Co., Ltd., molecular weight=244.36)

35 g of water diluted 20-fold with ethanol 11.9 g of phenyl triethoxysilane (Ph-1; manufactured by Tokyo Chemical Industry Co., Ltd., molecular weight=240.37)

1.4 g of tetra(2-ethylhexyl) titanate manufactured by Matsumoto Fine Chemical Co., Ltd. (ORGATIX TA-30; molecular weight=564.75)

The molar ratio between the PDMS-2 (FM8826) and the Ph-1 (phenyl triethoxysilane) is PDMS-2:Ph-1=1:2, the molar ratio between the PDMS-2 (FM8826) and the Ph-2 (diphenyl dimethoxysilane) is 1:1, and the molar ratio between the PDMS-2 (FM8826) and ORGATIX TA-30 is PDMS-2:TA-30=1:0.1.

Synthesis Example 7

[Preparation of Phenyl-Modified Hybrid Prepolymer (B-3) Sol]

A phenyl-modified hybrid prepolymer (B-3) sol was prepared in the same manner as in Synthesis Example 5 except that the following raw materials were used.

495.8 g of FM8826 manufactured by JNC CORPORATION (number-average molecular weight (Mn)=20,000, distribution index of molecular weight (Mw/Mn)=1.06) as polydimethylsiloxane having trialkoxysilyl groups at both ends (PDMS-2)

12.1 g of diphenyl dimethoxysilane (Ph-2; KBM-202SS manufactured by Shin-Etsu Chemical Co., Ltd., molecular weight=244.36)

35 g of water diluted 20-fold with ethanol 6.0 g of phenyl triethoxysilane (Ph-1; manufactured by Tokyo Chemical Industry Co., Ltd., molecular weight=240.37)

1.4 g of tetra(2-ethylhexyl) titanate manufactured by Matsumoto Fine Chemical Co., Ltd. (ORGATIX TA-30; molecular weight=564.75)

The molar ratio between the PDMS-2 (FM8826) and the Ph-1 (phenyl triethoxysilane) is PDMS-2:Ph-1=1:1, the molar ratio between the PDMS-2 (FM8826) and the Ph-2 (diphenyl dimethoxysilane) is 1:2, and the molar ratio between the PDMS-2 (FM8826) and ORGATIX TA-30 is PDMS-2:TA-30=1:0.1.

Example 1

[Preparation of Phenyl-Modified Polydimethylsiloxane-Based Hybrid Prepolymer (C-1-1 to 1-4) Sols]

The prepared phenyl-modified hybrid prepolymer (A-1) sol and phenyl-modified hybrid prepolymer (B-1) sol were mixed in mass ratios of (A-1) sol/(B-1) sol of 75/25, 50/50, 25/75, and 0/100 and stirred at room temperature for 1 hour in a nitrogen atmosphere to prepare phenyl-modified polydimethylsiloxane-based hybrid prepolymer (C-1-1 to 1-4) sols. The prepared phenyl-modified polydimethylsiloxane-based hybrid prepolymer (C-1-1 to 1-4) sols were solidified by heat treatment at 80° C. for 1 hour and then at 180° C. for 5 hours.

Example 2

[Preparation of Phenyl-Modified Polydimethylsiloxane-Based Hybrid Prepolymer (C-2-1 to 2-5) Sols]

The prepared phenyl-modified hybrid prepolymer (A-2) sol and phenyl-modified hybrid prepolymer (B-1) sol were mixed in mass ratios of (A-2) sol/(B-1) sol of 99/1, 75/25, 50/50, 25/75, and 0/100 and stirred at room temperature for 1 hour in a nitrogen atmosphere to prepare phenyl-modified polydimethylsiloxane-based hybrid prepolymer (C-2-1 to 2-5) sols. The prepared phenyl-modified polydimethylsiloxane-based hybrid prepolymer (C-2-1 to 2-5) sols were solidified by heat treatment at 80° C. for 1 hour and then at 180° C. for 5 hours.

Example 3

[Preparation of Phenyl-Modified Polydimethylsiloxane-Based Hybrid Prepolymer (C-3-1 to 3-4) Sols]

The prepared phenyl-modified hybrid prepolymer (A-4) sol and phenyl-modified hybrid prepolymer (B-1) sol were mixed in mass ratios of (A-4) sol/(B-1) sol of 75/25, 50/50, 25/75, and 0/100 and stirred at room temperature for 1 hour in a nitrogen atmosphere to prepare phenyl-modified polydimethylsiloxane-based hybrid prepolymer (C-3-1 to 3-4) sols. The prepared phenyl-modified polydimethylsiloxane-based hybrid prepolymer (C-3-1 to 3-4) sols were solidified by heat treatment at 80° C. for 1 hour and then at 180° C. for 5 hours.

Example 4

[Preparation of Phenyl-Modified Polydimethylsiloxane-Based Hybrid Prepolymer (C-4-1 to 4-4) Sols]

The prepared phenyl-modified hybrid prepolymer (A-2) sol and phenyl-modified hybrid prepolymer (B-2) sol were mixed in mass ratios of (A-2) sol/(B-2) sol of 75/25, 50/50, 25/75, and 0/100 and stirred at room temperature for 1 hour in a nitrogen atmosphere to prepare phenyl-modified polydimethylsiloxane-based hybrid prepolymer (C-4-1 to 4-4) sols. The prepared phenyl-modified polydimethylsiloxane-based hybrid prepolymer (C-4-1 to 4-4) sols were solidified by heat treatment at 80° C. for 1 hour and then at 180° C. for 5 hours.

Example 5

[Preparation of Phenyl-Modified Polydimethylsiloxane-Based Hybrid Prepolymer (C-5-1 to 5-4) Sols]

The prepared phenyl-modified hybrid prepolymer (A-2) sol and phenyl-modified hybrid prepolymer (B-3) sol were mixed in mass ratios of (A-2) sol/(B-3) sol of 75/25, 50/50, 25/75, and 0/100 and stirred at room temperature for 1 hour in a nitrogen atmosphere to prepare phenyl-modified polydimethylsiloxane-based hybrid prepolymer (C-5-1 to 5-4) sols. The prepared phenyl-modified polydimethylsiloxane-based hybrid prepolymer (C-5-1 to 5-4) sols were solidified by heat treatment at 80° C. for 1 hour and then at 180° C. for 5 hours.

Example 6

[Preparation of Phenyl-Modified Polydimethylsiloxane-Based Hybrid Prepolymer (C-6-1 to 6-4) Sols]

The prepared phenyl-modified hybrid prepolymer (A-3) sol and phenyl-modified hybrid prepolymer (B-1) sol were mixed in mass ratios of (A-3 sol/(B-1) sol of 75/25, 50/50, 25/75, and 0/100 and stirred at room temperature for 1 hour in a nitrogen atmosphere to prepare phenyl-modified polydimethylsiloxane-based hybrid prepolymer (C-6-1 to 6-4) sols. The prepared phenyl-modified polydimethylsiloxane-based hybrid prepolymer (C-6-1 to 6-4) sols were solidified by heat treatment at 80° C. for 1 hour and then at 180° C. for 5 hours.

Comparative Example 1

A reactor equipped with a stirrer, a thermometer, and a dropping means was sufficiently filled with nitrogen gas. The nitrogen gas used at this time was produced by a nitrogen gas production apparatus (UNX-200 manufactured by Japan Unix Co., Ltd.).

Then, 226.2 g of FM9927 manufacture by JNC CORPORATION (number-average molecular weight Mn=32,000, distribution index of molecular weight (Mw/Mn)=1.09) as polydimethylsiloxane having silanol groups at both ends (PDMS-1) and 23.4 g of Silicate 40 manufactured by TAMA CHEMICALS CO., LTD. (linear tetramer to hexamer oligomer of tetraethoxysilane; oligomer purity after purification: 90% by mass, average molecular weight=745) were placed in the reactor sufficiently filled with the nitrogen gas and stirred at room temperature for 30 minutes.

Then, 0.02 g of dibutyltin dilaurate as a condensation catalyst was placed therein, and the temperature of the mixture was increased from room temperature to 100° C. at a rate of 10° C./min. The mixture was further reacted at 100° C. for 1 hour, and was then allowed to stand to be cooled to room temperature to obtain a prepolymer (a-1) sol. The molar ratio between FM9927 and oligomers contained in Silicate 40 is 1:4.

The obtained (a-1) sol and the phenyl-modified hybrid prepolymer (B-1) sol obtained in Synthesis Example 5 were mixed in mass ratios of (a-1) sol/(B-1) sol of 75/25, 50/50, and 25/75 and stirred at room temperature for 1 hour in a nitrogen atmosphere to prepare phenyl-modified polydimethylsiloxane-based hybrid prepolymer (c-1-1 to 1-3) sols. The prepared phenyl-modified polydimethylsiloxane-based hybrid prepolymer (c-1-1 to 1-3) sols were solidified by heat treatment at 80° C. for 1 hour and then at 180° C. for 5 hours.

Comparative Example 2

Under the same conditions as in Comparative Example 1, 226.2 g of XF3905 manufacture by Momentive Performance Materials Inc. (number-average molecular weight Mn=20,000, distribution index of molecular weight (Mw/Mn)=1.5) as polydimethylsiloxane having silanol groups at both ends (PDMS-1') and 18.7 g of Silicate 40 manufactured by TAMA CHEMICALS CO., LTD. (linear tetramer to hexamer oligomer of tetraethoxysilane; oligomer purity after purification: 90% by mass, average molecular weight=745) were placed in the reactor and stirred at room temperature for 30 minutes.

Then, 0.02 g of dibutyltin dilaurate as a condensation catalyst was placed therein, and the temperature of the mixture was increased from room temperature to 100° C. at a rate of 10° C./min. The mixture was further reacted at 100° C. for 1 hour, and was then allowed to stand to be cooled to room temperature to obtain a prepolymer (a-2) sol. The molar ratio between XF3905 and oligomers contained in Silicate 40 is 1:2.

The obtained (a-2) sol and the phenyl-modified hybrid prepolymer (B-1) sol obtained in Synthesis Example 5 were mixed in mass ratios of (a-2) sol/(B-1) sol of 75/25, 50/50, and 25/75 and stirred at room temperature for 1 hour in a nitrogen atmosphere to prepare phenyl-modified polydimethylsiloxane-based hybrid prepolymer (c-2-1 to 2-3) sols. The prepared phenyl-modified polydimethylsiloxane-based hybrid prepolymer (c-2-1 to 2-3) sols were solidified by heat treatment at 80° C. for 1 hour and then at 200° C. for 5 hours.

Comparative Example 3

Under the same conditions as in Comparative Example 1, 495.8 g of FM8826 manufacture by JNC CORPORATION (number-average molecular weight (Mn)=20,000, distribution index of molecular weight (Mw/Mn)=1.06) as polydimethylsiloxane having trialkoxysilyl groups at both ends (PDMS-2) and 1.5 g (1:0.1 mol) of dibutyltin dilaurate (molecular weight=631.56) were placed in the reactor and stirred at room temperature for 15 minutes to obtain a (b-1) sol.

The phenyl-modified hybrid prepolymer (A-2) sol obtained in Synthesis Example 2 and the (b-1) sol were mixed in mass ratios of (A-2) sol/(b-1) sol of 75/25, 50/50, 25/75, and 0/100 and stirred at room temperature for 1 hour in a nitrogen atmosphere to prepare phenyl-modified polydimethylsiloxane-based hybrid prepolymer (c-3-1 to 3-4) sols. The prepared phenyl-modified polydimethylsiloxane-based hybrid prepolymer (c-3-1 to 3-4) sols were solidified by heat treatment at 80° C. for 1 hour and then at 200° C. for 5 hours. This solidified object has a very wavy surface, which causes a problem during use depending on the intended use.

<Method for Evaluating Heat-Resistant Properties>

Heat-resistant properties were evaluated in the following manner. Each of the phenyl-modified polydimethylsiloxane-based hybrid prepolymer (C) sols of Examples 1 to 6 and the sols of Comparative Examples 1 to 3 was charged into aluminum cups having a diameter of 50 mm so as to have a film thickness of 8 mm, and was then subjected to a heat treatment step to form solidified bodies. The aluminum cups were stored up to 1000 hours in a convection drying furnace at 250° C. in the atmosphere to prepare samples after storage for 100 hours, 500 hours, and 1000 hours (in Example 3, samples after storage for 24 hours and 100 hours), and the mass of each of the samples was measured with an electronic balance to calculate a mass decrease rate. Next-generation power modules that have been studied as modules to which the present invention can be applied, such as SiC and GaN, are often required to have a seal of about 1 cm for the purpose of eliminating unevenness in module circuits. In consideration of this point, the film thickness of the sample to be evaluated was set to 8 mm. The evaluation results are summarized in Tables 1 to 3.

<Method for Evaluating Hardness>

Hardness was measured and evaluated in the following manner. Samples of each of Examples 1 to 6 and Comparative Examples 1 to 3 (film thickness: 8 mm) were stored up to 1000 hours in a convection drying furnace at 250° C. in the atmosphere to prepare samples after storage for 100 hours, 500 hours, and 1000 hours (in Example 3, samples after storage for 24 hours and 100 hours), and the hardness of each of the samples was measured in accordance with JIS K 6253 and ISO 7619 using a durometer type E for soft rubber (low hardness) (n=5). The evaluation results are summarized in Tables 1 to 3.

<Method for Evaluating Tack Force>
Method for Preparing Measurement Sample:
Sample: 10 g of each of the phenyl-modified polydimethylsiloxane-based hybrid prepolymer (C) sols of Examples 1 to 6 and the sols of Comparative Examples 1 to 3 was charged into aluminum cups having a diameter of 50 mm, and was then subjected to a heat treatment step to prepare solidified bodies. The aluminum cups were stored up to 1000 hours in a convection drying furnace at 250° C. in the atmosphere to prepare samples after storage for 100 hours, 500 hours, and 1000 hours (in Example 3, samples after storage for 24 hours and 100 hours).

Preparation of Force Gauge for Measurement:
A force gauge (AD-4932A-50N manufactured by A&D Company Limited) was used, and a cover glass (□18 mm) was fixed to the tip of a probe used for measurement with an adhesive tape.

Tack force was measured in the following manner. First, the probe having the cover glass fixed thereto was pressed against the flat surface of the sample at a force of 20 N while the display of the force gauge was monitored (S1). Then, the force was removed to return the sample to a state where the cover glass as a probe was just contacted with the surface of the sample so that the force was reset to zero (S2). Then, the aluminum cup was fixed, and the force gauge was lifted up to tear the cover glass as a probe off the sample surface, and the maximum tack strength of the sample surface was read off (S3). A series of the operations of S1 to S3 was repeated five times, and 3 values other than upper and lower limit values were averaged to determine a measured value. The results are shown in Tables 1 to 3.

TABLE 1

|     |     | Example 1 | | | | | Example 2 | | | | | Example 3 | | | |
| --- | --- | --- | --- | --- | --- | --- | --- | --- | --- | --- | --- | --- | --- | --- | --- |
| (A) | PDMS with silanol groups at both ends (PDMS-1)/(PDMS-1') | FM9927 | | | | | FM9927 | | | | | FM9927 | | | |
|     | Mw/Mn | 1.09 | | | | | 1.09 | | | | | 1.37 | | | |
|     | Mn | 32,000 | | | | | 32,000 | | | | | 44,000 | | | |
|     | $PhSi(OR)_3$ (Ph-1) | $PhSi(OC_2H_5)_3$ | | | | | $PhSi(OC_2H_5)_3$ | | | | | $PhSi(OC_2H_5)_3$ | | | |
|     | Mixing ratio(molar ratio) (PDMS-1/1'):(Ph-1) | 1:1 | | | | | 1:2 | | | | | 1:2.8 | | | |
|     | Ethyl silicate (ES) | — | | | | | — | | | | | — | | | |
|     | Mixing ratio(molar ratio) (PDMS-1/1'):(ES) | — | | | | | — | | | | | — | | | |
|     | Catalyst TA-30(Ti)/dibutyltin dilaurate(Sn) | Ti | | | | | Ti | | | | | Ti | | | |
| (B) | PDMS with trialkoxysilyl groups at both ends (PDMS-2) | FM8826 | | | | | FM8826 | | | | | FM8826 | | | |
|     | Mw/Mn | 1.06 | | | | | 1.06 | | | | | 1.06 | | | |
|     | Mn | 20,000 | | | | | 20,000 | | | | | 20,000 | | | |
|     | $PhSi(OR)_3$ (Ph-1) | $PhSi(OC_2H_5)_3$ | | | | | $PhSi(OC_2H_5)_3$ | | | | | $PhSi(OC_2H_5)_3$ | | | |
|     | $Ph_2Si(OR)_2$ (Ph-2) | $Ph_2Si(OCH_3)_2$ | | | | | $Ph_2Si(OCH_3)_2$ | | | | | $Ph_2Si(OCH_3)_2$ | | | |
|     | Mixing ratio(molar ratio) (PDMS-2):(Ph-1):(Ph-2) | 1:2:2 | | | | | 1:2:2 | | | | | 1:2:2 | | | |
|     | Catalyst TA-30(Ti)/dibutyltin dilaurate(Sn) | Ti | | | | | Ti | | | | | Ti | | | |
| (C) | (A)/(B) (mass ratio between formed sols) | 75/25 | 50/50 | 25/75 | 0/100 | 99/1 | 75/25 | 50/50 | 25/75 | 0/100 | | 75/25 | 50/50 | 25/75 | 0/100 |
| Mass decrease rate | after storage at 250° C. for 24 hr (%) | — | — | — | — | — | — | — | — | — | | 0.2 | 0.1 | 0.1 | — |
|     | after storage at 250° C. for 100 hr (%) | 1.8 | 2.4 | 2.2 | 1.3 | 0.54 | 2.1 | 3.2 | 2.7 | 1.3 | | 0.9 | 1.2 | 2.3 | 1.3 |
|     | after storage at 250° C. for 500 hr (%) | 2.1 | 2.7 | 2.5 | 2.1 | 2.7 | 2.7 | 4.3 | 3.5 | 2.1 | | — | — | — | 2.1 |
|     | after storage at 250° C. for 1,000 hr (%) | 4.9 | 6.6 | 6.2 | 4.3 | 5.7 | 5.5 | 6.7 | 6.3 | 4.3 | | — | — | — | 4.3 |
| E hardness | Initial value | 18 | 22 | 36 | 45 | 14 | 19 | 25 | 28 | 45 | | 21 | 28 | 32 | 45 |
|     | after storage at 250° C. for 24 hr | — | — | — | — | — | — | — | — | — | | 22 | 32 | 35 | — |
|     | after storage at 250° C. for 100 hr | 34 | 43 | 46 | 50 | 22 | 26 | 33 | 37 | 50 | | 26 | 32 | 36 | 50 |
|     | after storage at 250° C. for 500 hr | 35 | 44 | 47 | 50 | 26 | 29 | 38 | 42 | 50 | | — | — | — | 50 |
|     | after storage at 250° C. for 1,000 hr | 35 | 44 | 47 | 51 | 28 | 34 | 40 | 45 | 51 | | — | — | — | 51 |
| Tack force | Initial value (N) | — | — | — | 0 | — | 3.5 | 2.3 | 0 | 0 | | 4.1 | 3.5 | 0 | 0 |
|     | after storage at 250° C. for 24 hr (N) | — | — | — | — | — | — | — | — | — | | 4.3 | 3.5 | 0.80 | — |
|     | after storage at 250° C. for 100 hr (N) | 5.2 | 4.8 | 1.3 | 0 | — | 4.8 | 3.2 | 2.5 | 0 | | 4.5 | 3.8 | 1.2 | 0 |

TABLE 1-continued

|  |  | Example 1 | | | | | Example 2 | | | | | Example 3 | | |
|---|---|---|---|---|---|---|---|---|---|---|---|---|---|---|
|  | after storage at 250° C. for 500 hr (N) | O.L. | 5.8 | 2.0 | 0 | — | O.L. | 5.4 | 4.5 | 0 | — | — | — | 0 |
|  | after storage at 250° C. for 1,000 hr (N) | O.L. | O.L. | O.L. | 0 | — | O.L. | O.L. | O.L. | 0 | — | — | — | 0 |
| Notes |  |  |  |  |  |  |  |  |  |  |  |  |  |  |

*O.L.: Overload

TABLE 2

|  |  | Example 4 | | | | Example 5 | | | | Example 6 | | | |
|---|---|---|---|---|---|---|---|---|---|---|---|---|---|
| (A) | PDMS with silanol groups at both ends (PDMS-1)/(PDMS-1') | FM9927 | | | | FM9927 | | | | FM9927 | | | |
|  | Mw/Mn | 1.09 | | | | 1.09 | | | | 1.09 | | | |
|  | Mn | 32,000 | | | | 32,000 | | | | 32,000 | | | |
|  | PhSi(OR)$_3$ (Ph-1) | PhSi(OC$_2$H$_5$)$_3$ | | | | PhSi(OC$_2$H$_5$)$_3$ | | | | PhSi(OC$_2$H$_5$)$_3$ | | | |
|  | Mixing ratio(molar ratio) (PDMS-1/1'):(Ph-1) | 1:2 | | | | 1:2 | | | | 1:4 | | | |
|  | Ethyl silicate (ES) | — | | | | — | | | | — | | | |
|  | Mixing ratio(molar ratio) (PDMS-1/1'):(ES) |  | | | |  | | | |  | | | |
|  | Catalyst TA-30(Ti)/dibutyltin dilaurate(Sn) | Ti | | | | Ti | | | | Ti | | | |
| (B) | PDMS with trialkoxysilyl groups at both ends (PDMS-2) | FM8826 | | | | FM8826 | | | | FM8826 | | | |
|  | Mw/Mn | 1.06 | | | | 1.06 | | | | 1.06 | | | |
|  | Mn | 20,000 | | | | 20,000 | | | | 20,000 | | | |
|  | PhSi(OR)$_3$ (Ph-1) | PhSi(OC$_2$H$_5$)$_3$ | | | | PhSi(OC$_2$H$_5$)$_3$ | | | | PhSi(OC$_2$H$_5$)$_3$ | | | |
|  | Ph$_2$Si(OR)$_2$ (Ph-2) | Ph$_2$Si(OCH$_3$)$_2$ | | | | Ph$_2$Si(OCH$_3$)$_2$ | | | | Ph$_2$Si(OCH$_3$)$_2$ | | | |
|  | Mixing ratio(molar ratio) (PDMS-2):(Ph-1):(Ph-2) | 1:2:1 | | | | 1:1:2 | | | | 1:2:2 | | | |
|  | Catalyst TA-30(Ti)/dibutyltin dilaurate(Sn) | Ti | | | | Ti | | | | Ti | | | |
| (C) | (A)/(B) (mass ratio between formed sols) | 75/25 | 50/50 | 25/75 | 0/100 | 75/25 | 50/50 | 25/75 | 0/100 | 75/25 | 50/50 | 25/75 | 0/100 |
| Mass decrease rate | after storage at 250° C. for 24 hr (%) | — | — | — | — | — | — | — | — | — | — | — | — |
|  | after storage at 250° C. for 100 hr (%) | 1.6 | 1.5 | 1.0 | 2.1 | 1.7 | 1.3 | 0.99 | 2.4 | 2.0 | 2.2 | 3.2 | 1.3 |
|  | after storage at 250° C. for 500 hr (%) | 3.1 | 2.9 | 2.8 | 3.1 | 3.5 | 3.1 | 3.3 | 3.6 | 2.9 | 3.2 | 4.5 | 2.1 |
|  | after storage at 250° C. for 1,000 hr (%) | 5.2 | 5.3 | 4.9 | 5.9 | 5.5 | 5.8 | 5.7 | 7.0 | 5.8 | 6.2 | 6.9 | 4.3 |
| E hardness | Initial value | 17 | 20 | 21 | 38 | 16 | 23 | 27 | 38 | 10 | 14 | 22 | 45 |
|  | after storage at 250° C. for 24 hr | — | — | — | — | — | — | — | — | — | — | — | — |
|  | after storage at 250° C. for 100 hr | 32 | 35 | 38 | 43 | 32 | 35 | 38 | 42 | 20 | 21 | 28 | 50 |
|  | after storage at 250° C. for 500 hr | 33 | 40 | 43 | 45 | 32 | 37 | 43 | 45 | 22 | 28 | 38 | 50 |
|  | after storage at 250° C. for 1,000 hr | 34 | 40 | 45 | 45 | 33 | 38 | 44 | 48 | 26 | 44 | 48 | 51 |
| Tack force | Initial value (N) | — | — | — | — | 1.5 | 2.1 | 1.0 | 0 | — | — | — | 0 |
|  | after storage at 250° C. for 24 hr (N) | — | — | — | — | — | — | — | — | — | — | — | — |
|  | after storage at 250° C. for 100 hr (N) | 2.0 | 1.8 | 1.2 | 0.70 | 2.9 | 2.5 | 2.0 | 1.2 | — | — | — | 0 |
|  | after storage at 250° C. for 500 hr (N) | O.L. | 4.5 | 1.6 | 1.6 | O.L. | 4.9 | 3.2 | 2.4 | — | — | — | 0 |
|  | after storage at 250° C. for 1,000 hr (N) | O.L. | 4.7 | 2.4 | 1.8 | O.L. | O.L. | 4.1 | 3.1 | — | — | — | 0 |
| Notes |  |  |  |  |  |  |  |  |  |  |  |  |  |

*O.L.: Overload

TABLE 3

|  |  | Comparative Example 1 | Comparative Example 2 | Comparative Example 3 |
|---|---|---|---|---|
| (A) | PDMS with silanol groups at both ends (PDMS-1)/(PDMS-1') | FM9927 | XF3905 | FM9927 |

TABLE 3-continued

| | | Comparative Example 1 | | | Comparative Example 2 | | | Comparative Example 3 | | | |
|---|---|---|---|---|---|---|---|---|---|---|---|
| | Mw/Mn | 1.09 | | | 1.5 | | | 1.09 | | | |
| | Mn | 32,000 | | | 20,000 | | | 32,000 | | | |
| | PhSi(OR)$_3$ (Ph-1) | — | | | — | | | PhSi(OC$_2$H$_5$)$_3$ | | | |
| | Mixing ratio(molar ratio) (PDMS-1/1'):(Ph-1) | | | | | | | 1:2 | | | |
| | Ethyl silicate (ES) | ES40 | | | ES40 | | | — | | | |
| | Mixing ratio(molar ratio) (PDMS-1/1'):(ES) | 1:4 | | | 1:2 | | | — | | | |
| | Catalyst TA-30(Ti)/dibutyltin dilaurate(Sn) | Sn | | | Sn | | | Ti | | | |
| (B) | PDMS with trialkoxysilyl groups at both ends (PDMS-2) | FM8826 | | | FM8826 | | | FM8826 | | | |
| | Mw/Mn | 1.06 | | | 1.06 | | | 1.06 | | | |
| | Mn | 20,000 | | | 20,000 | | | 20,000 | | | |
| | PhSi(OR)$_3$ (Ph-1) | PhSi(OC$_2$H$_5$)$_3$ | | | PhSi(OC$_2$H$_5$)$_3$ | | | — | | | |
| | Ph$_2$Si(OR)$_2$ (Ph-2) | Ph$_2$Si(OCH$_3$)$_2$ | | | Ph$_2$Si(OCH$_3$)$_2$ | | | — | | | |
| | Mixing ratio(molar ratio) (PDMS-2):(Ph-1):(Ph-2) | 1:2:2 | | | 1:2:2 | | | — | | | |
| | Catalyst TA-30(Ti)/dibutyltin dilaurate(Sn) | Ti | | | Ti | | | Sn | | | |
| (C) | (A)/(B) (mass ratio between formed sols) | 75/25 | 50/50 | 25/75 | 75/25 | 50/50 | 25/75 | 75/25 | 50/50 | 25/75 | 0/100 |
| Mass decrease rate | after storage at 250° C. for 24 hr (%) | — | — | — | — | — | — | — | — | — | — |
| | after storage at 250° C. for 100 hr (%) | 0.90 | 0.88 | — | 1.5 | 4.6 | — | 0.63 | — | 0.43 | 2.2 |
| | after storage at 250° C. for 500 hr (%) | 1.9 | 2.1 | — | 6.8 | 11.1 | — | 0.99 | — | 0.89 | 4.6 |
| | after storage at 250° C. for 1,000 hr (%) | 2.3 | 2.5 | — | 7.3 | 11.6 | — | 4.6 | — | 2.9 | 7.6 |
| E hardness | Initial value | 55 | 50 | — | 63 | 48 | — | 32 | — | 45 | 57 |
| | after storage at 250° C. for 24 hr | — | — | — | — | — | — | — | — | — | — |
| | after storage at 250° C. for 100 hr | 55 | 52 | — | 70 | 57 | — | 32 | — | 48 | 60 |
| | after storage at 250° C. for 500 hr | 56 | 53 | — | 73 | 60 | — | 35 | — | 50 | 74 |
| | after storage at 250° C. for 1,000 hr | 56 | 53 | — | 74 | 61 | — | 36 | — | 50 | 77 |
| Tack force | Initial value (N) | — | — | Unmeasurable | — | — | Unmeasurable | — | Unmeasurable | — | — |
| | after storage at 250° C. for 24 hr (N) | — | — | | — | — | | — | | — | — |
| | after storage at 250° C. for 100 hr (N) | 1.9 | 1.3 | | 0 | 0 | | 0.51 | | 0.47 | 0 |
| | after storage at 250° C. for 500 hr (N) | 0 | 0.67 | | 0 | 0 | | 4.9 | | 0.60 | 0 |
| | after storage at 250° C. for 1,000 hr (N) | 0 | 0 | | 0 | 0 | | O.L. | | 1.0 | 0 |
| | Notes | 25/75: Wavy survace | | | 25/75: Wavy surface | | | 50/50: Wavy surface | | | |

*O.L.: Overload

<Evaluation Results of Heat-Resistant Properties>

As can be seen from Tables 1 to 3, all the samples of the polymers obtained from the phenyl-modified polydimethylsiloxane-based hybrid prepolymers (C) according to the present invention (Examples 1 to 6) and the polymers of Comparative Examples 1 and 3 exhibit a low mass decrease rate and have sufficient heat resistance. On the other hand, the polymer of Comparative Example 2 uses PDMS having silanol groups at both ends and a distribution index of molecular weight of 1.5 larger than 1.4, and therefore exhibits a high mass decrease rate.

<Evaluation Results of Hardness>

As can be seen from Tables 1 to 3, the polymers obtained from the phenyl-modified polydimethylsiloxane-based hybrid prepolymers (C) according to the present invention (Examples 1 to 6) can provide wide variety of products from low-hardness products of E30 or less to products of about E40 depending on the intended use by changing the compositions of the phenyl-modified hybrid prepolymers (A) and (B) or the mixing ratio of (A)/(B). On the other hand, the polymers of Comparative Examples 1 to 3, other than c-3-1 of Comparative Example 3, have a hardness of higher than E50 and are therefore excessively hard.

<Evaluation Results of Tack Force>

As can be seen from Tables 1 to 3, the tackiness of the polymers obtained from the phenyl-modified polydimethylsiloxane-based hybrid prepolymers (C) according to the present invention (Examples 1 to 6) can be adjusted depending on the intended use by changing the compositions of the phenyl-modified hybrid prepolymers (A) and (B) or the mixing ratio of (A)/(B). On the other hand, the polymers of Comparative Examples 1 to 3, other than c-3-1 of Comparative Example 3, have excessively low tackiness.

<Summary>

As can be seen from the above results, the polymers obtained from the phenyl-modified polydimethylsiloxane-based hybrid prepolymers (C) according to the present invention (Examples 1 to 6) are excellent in heat resistance, and their hardness or tackiness can be adjusted over a wide range by changing the compositions of the phenyl-modified hybrid prepolymers (A) and (B) or the mixing ratio of (A)/(B). On the other hand, the polymers of Comparative Examples 1 to 3 cannot achieve the object of the present invention, that is, the polymers of Comparative Examples 1 to 3 cannot have high heat resistance, and their hardness or tackiness cannot be freely adjusted.

As described above, in the present invention, the phenyl-modified hybrid prepolymers (A) and (B) are appropriately mixed depending on desired material hardness or surface properties (tackiness) to provide the phenyl-modified polydimethylsiloxane-based hybrid prepolymer (C). Then, the hybrid prepolymer (C) is heat-treated to provide a solidified body. In the case of a heat dissipation sheet or the like, the hybrid prepolymer (C) is mixed with ceramic particles or the like for the purpose of imparting heat conductivity, and the mixture is kneaded, processed into a sheet shape or the like, and heat-treated to obtain a solidified body. When the surface of the solidified body is required to have tackiness, the ratio of the phenyl-modified hybrid prepolymer (A) to be mixed is increased, and on the other hand, when the surface of the solidified body is required to have releasability, the ratio of the phenyl-modified hybrid prepolymer (B) to be mixed is increased.

The phenyl-modified hybrid prepolymers (A) and (B) can be mixed in a sol mass ratio of (A)-containing sol/(B)-containing sol=100/0 (except for 100/0) to 0:100. A solidified body obtained by thermosetting a prepolymer prepared by mixing the phenyl-modified hybrid prepolymers (A) and (B) in a ratio of 100:0 (except for 100/0), that is, a solidified body obtained by thermosetting a prepolymer containing an extremely large amount of the phenyl-modified hybrid prepolymer (A) is maintained as a gel-like solidified body having excellent tackiness even at 200° C. or higher for a long time. On the other hand, a solidified body obtained by thermosetting a prepolymer prepared by mixing the phenyl-modified hybrid prepolymers (A) and (B) in a ratio of 0:100, that is, a solidified body obtained by thermosetting only the phenyl-modified hybrid prepolymer (B) can provide a hard film having high hardness and excellent surface releasability. The mixing ratio can be set within a wide range from a mass ratio of (A)-containing sol/(B)-containing sol of 100/0 (except for 100/0) to 0/100. The mass ratio of (A)-containing sol/(B)-containing sol is more preferably 99/1 to 20/80. It is to be noted that a member such as a heat dissipation sheet is required to have flexibility, and therefore the mixing ratio is preferably set so that the mass of the phenyl-modified hybrid prepolymer (A) is higher than that of the phenyl-modified hybrid prepolymer (B). By setting the mass ratio of (A)-containing sol/(B)-containing sol to about 99/1 to 65/35, a material can be obtained which is suitable as a matrix material of a member required to have flexibility, such as a heat dissipation sheet.

[Modified Example]

The present invention is not limited to only the above-described Examples, and any changes, deletions, and additions may be made to the present invention without departing from the technical ideas of the present invention which can be recognized by those skilled in the art from claims and description in the specification.

In the above Examples, the phenyl-modified polydimethylsiloxane-based hybrid prepolymer (C) is a sol, and therefore a heat-treated solid or semi-solid (gel) molded object is obtained by applying or charging the phenyl-modified polydimethylsiloxane-based hybrid prepolymer sol to or into a tray such as a mold and then subjecting the sol to drying and heat treatment for solidification (gelation). The shape of the molded object is not particularly limited, but is generally a sheet or plate shape. The molded object may also be interposed between materials to be bonded together by utilizing its adhesiveness. The solidified object (gelled object) of the phenyl-modified polydimethylsiloxane-based hybrid prepolymer sol according to the present invention has elastic properties in a high-temperature atmosphere, and has therefore excellent stress relaxing capability against the thermal expansion of an adherend caused by thermal shock. Therefore, the solidified object (gelled object) of the phenyl-modified polydimethylsiloxane-based hybrid prepolymer sol according to the present invention can be used as an adhesive layer to be interposed between adherends made of different materials to relieve thermal stress.

As described above, it is an object of the present invention to control the material hardness of an elastic body required to have heat resistance while maintaining the adhesive force and heat resistance of the elastic body. When a heat-resistant elastic material is applied, the heat-resistant elastic material is required to have low hardness close to the hardness of gel in some cases, but in other cases, the heat-resistant elastic material is required to have a tack-free hard surface. According to the present invention, material hardness can easily be controlled by changing the mixing ratio between two liquids without the need for re-examining the composition of a material while adhesion properties and heat-resistant properties at 200° C. or higher can be maintained.

The present invention is summarized as follows.

(1) A phenyl-modified hybrid prepolymer (B) according to a first aspect of the present invention is prepared by subjecting polydimethylsiloxane having trialkoxysilyl groups at both ends, phenyltrialkoxysilane, and diphenyldialkoxysilane to hydrolysis and condensation reaction.

(2) In the phenyl-modified hybrid prepolymer (B) according to the first aspect of the present invention described in the above (1), the polydimethylsiloxane having trialkoxysilyl groups at both ends preferably has a number-average molecular weight (Mn) of 3,000 to 30,000 and a distribution index of molecular weight (Mw/Mn; Mw is weight-average molecular weight) of 1.3 or less.

(3) The phenyl-modified hybrid prepolymer (B) according to the first aspect of the present invention described in the above (1) or (2) is preferably prepared by subjecting the polydimethylsiloxane having trialkoxysilyl groups at both ends, the phenyltrialkoxysilane, and the diphenyldialkoxysilane to hydrolysis and condensation reaction in a molar ratio of 1:0.5 to 3:0.5 to 3.

(4) The phenyl-modified hybrid prepolymer (B) according to the first aspect of the present invention described in any one of the above (1) to (3) is preferably prepared using an alkoxide of titanium as a condensation catalyst.

(5) A phenyl-modified polydimethylsiloxane-based hybrid prepolymer (C) according to the first aspect of the present invention comprises at least the phenyl-modified hybrid prepolymer (B) according to any one of the above (1) to (4).

(6) The phenyl-modified polydimethylsiloxane-based hybrid prepolymer (C) according to the first aspect of the present invention is preferably prepared by mixing the phenyl-modified hybrid prepolymer (B) according to any one of the above (1) to (4) and a phenyl-modified hybrid prepolymer (A) prepared by condensation reaction between polydimethylsiloxane having silanol groups at both ends and phenyltrialkoxysilane.

(7) In the phenyl-modified polydimethylsiloxane-based hybrid prepolymer (C) according to the first aspect of the present invention described in the above (6), the polydimethylsiloxane having silanol groups at both ends preferably has a number-average molecular weight (Mn) of 18,000 to 60,000 and a distribution index of molecular weight (Mw/Mn; Mw is weight-average molecular weight) of 1.4 or less.

(8) In the phenyl-modified polydimethylsiloxane-based hybrid prepolymer (C) according to the first aspect of the present invention described in the above (6) or (7), the polydimethylsiloxane having silanol groups at both ends used to prepare the phenyl-modified hybrid prepolymer (A) preferably has a larger number-average molecular weight (Mn) than the polydimethylsiloxane having trialkoxysilyl groups at both ends used to prepare the phenyl-modified hybrid prepolymer (B).

(9) In the phenyl-modified polydimethylsiloxane-based hybrid prepolymer (C) according to the first aspect of the present invention described in any one of the above (6) to (8), the phenyl-modified hybrid prepolymer (A) is preferably prepared by condensation reaction between the polydimethylsiloxane having silanol groups at both ends and the phenyltrialkoxysilane in a molar ratio of 1:0.5 to 5.

(10) In the phenyl-modified polydimethylsiloxane-based hybrid prepolymer (C) according to the first aspect of the present invention described in any one of the above (6) to (9), the phenyl-modified hybrid prepolymer (A) is preferably prepared using an alkoxide of titanium as a condensation catalyst.

(11) A phenyl-modified polydimethylsiloxane-based hybrid polymer according to the first aspect of the present invention is obtained by heating and solidifying the phenyl-modified polydimethylsiloxane-based hybrid prepolymer (C) according to any one of the above (5) to (10).

(12) A method for producing a phenyl-modified hybrid prepolymer (B) according to a second aspect of the present invention comprises the step of subjecting polydimethylsiloxane having trialkoxysilyl groups at both ends, phenyltrialkoxysilane, and diphenyldialkoxysilane to hydrolysis and condensation reaction.

(13) In the method for producing a phenyl-modified hybrid prepolymer (B) according to the second aspect of the present invention described in the above (12), the polydimethylsiloxane having trialkoxysilyl groups at both ends preferably has a number-average molecular weight (Mn) of 3,000 to 30,000 and a distribution index of molecular weight (Mw/Mn; Mw is weight-average molecular weight) of 1.3 or less.

(14) In the method for producing a phenyl-modified hybrid prepolymer (B) according to the second aspect of the present invention described in the above (12) or (13), the polydimethylsiloxane having trialkoxysilyl groups at both ends, the phenyltrialkoxysilane, and the diphenyldialkoxysilane are preferably subjected to hydrolysis and condensation reaction in a molar ratio of 1:0.5 to 3:0.5 to 3 in the hydrolysis and condensation reaction step.

(15) In the method for producing a phenyl-modified hybrid prepolymer (B) according to the second aspect of the present invention described in any one of the above (12) to (14), an alkoxide of titanium is preferably used as a condensation catalyst in the hydrolysis and condensation reaction step.

(16) A method for producing a phenyl-modified polydimethylsiloxane-based hybrid prepolymer (C) according to the second aspect of the present invention comprises the step of mixing a phenyl-modified hybrid prepolymer (B) produced by the method according to any one of the above (12) to (15) and a phenyl-modified hybrid prepolymer (A) prepared by condensation reaction between polydimethylsiloxane having silanol groups at both ends and phenyltrialkoxysilane.

(17) In the method for producing a phenyl-modified polydimethylsiloxane-based hybrid prepolymer (C) according to the second aspect of the present invention described in the above (16), the polydimethylsiloxane having silanol groups at both ends preferably has a number-average molecular weight (Mn) of 18,000 to 60,000 and a distribution index of molecular weight (Mw/Mn; Mw is weight-average molecular weight) of 1.4 or less.

(18) In the method for producing a phenyl-modified polydimethylsiloxane-based hybrid prepolymer (C) according to the second aspect of the present invention described in the above (16) or (17), the polydimethylsiloxane having silanol groups at both ends used to prepare the phenyl-modified hybrid prepolymer (A) preferably has a larger number-average molecular weight (Mn) than the polydimethylsiloxane having trialkoxysilyl groups at both ends used to prepare the phenyl-modified hybrid prepolymer (B).

(19) In the method for producing a phenyl-modified polydimethylsiloxane-based hybrid prepolymer (C) according to the second aspect of the present invention described in any one of the above (16) to (18), the phenyl-modified hybrid prepolymer (A) is preferably prepared by condensation reaction between the polydimethylsiloxane having silanol groups at both ends and the phenyltrialkoxysilane in a molar ratio of 1:0.5 to 5.

(20) In the method for producing a phenyl-modified polydimethylsiloxane-based hybrid prepolymer (C) according to the second aspect of the present invention described in any one of the above (16) to (19), the phenyl-modified hybrid prepolymer (A) is preferably prepared using an alkoxide of titanium as a condensation catalyst.

(21) A method for producing a phenyl-modified polydimethylsiloxane-based hybrid polymer according to the second aspect of the present invention comprises the step of heating and solidifying a phenyl-modified polydimethylsiloxane-based hybrid prepolymer (C) comprising a phenyl-modified hybrid prepolymer (B) produced by the method according to any one of the above (12) to (15), or a phenyl-modified polydimethylsiloxane-based hybrid prepolymer (C) produced by the method according to any one of the above (16) to (20).

(22) A phenyl-modified hybrid prepolymer (B) according to a third aspect of the present invention contains a structural unit represented by the following formula (Ia) or (Ib):

[Chemical Formula 3]

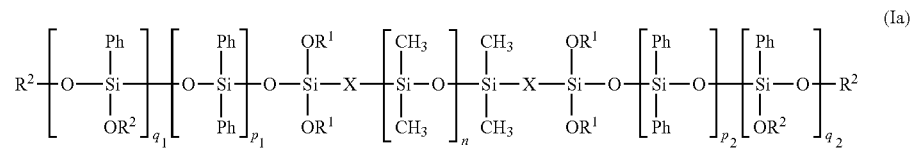

-continued

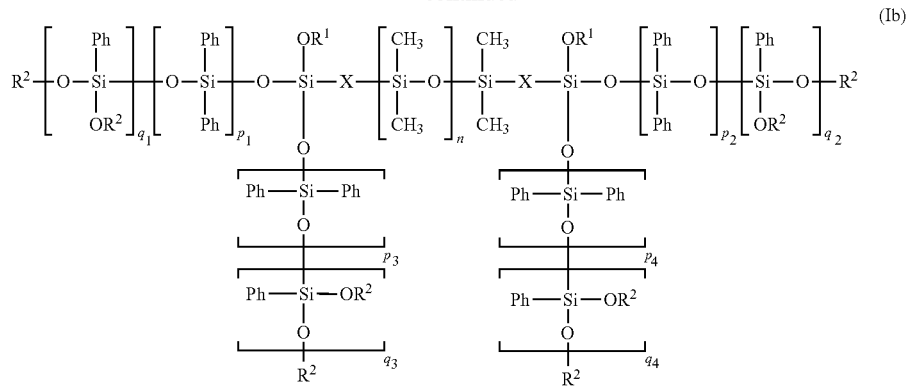

(Ib)

wherein $R^1$ and $R^2$ are each an alkyl group having 1 to 3 carbon atoms or H ($R^1$ and $R^2$ may be the same or different, two or more $R^1$s may be all the same or different from each other, and two or more $R^2$s may be all the same or different from each other); Ph is a phenyl group; X is oxygen or an alkylene group having 2 or less carbon atoms; n is a positive integer; $p_1=0$, 1, or 2 and $p_2=0$, 1, or 2 wherein $p_1+p_2 \geq 1$; $q_1=0$, 1, or 2 and $q_2=0$, 1, or 2 wherein $q_1+q_2 \geq 1$; $p_3=0$ or 1 and $p_4=0$ or 1 wherein $p_1 \geq p_3$ and $p_2 \geq p_4$; $q_3=0$, 1, or 2 and $q_4=0$, 1, or 2.

(23) A phenyl-modified hybrid prepolymer (B) according to a fourth aspect of the present invention contains a structural unit represented by any one of the following formulas (Ic), (Id), (Ie), (Ic'), (Id'), and (Ie'):

[Chemical Formula 4]

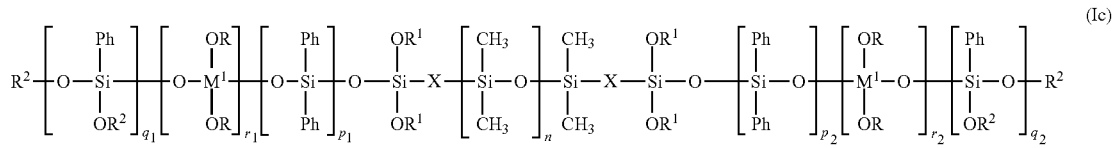

(Ic)

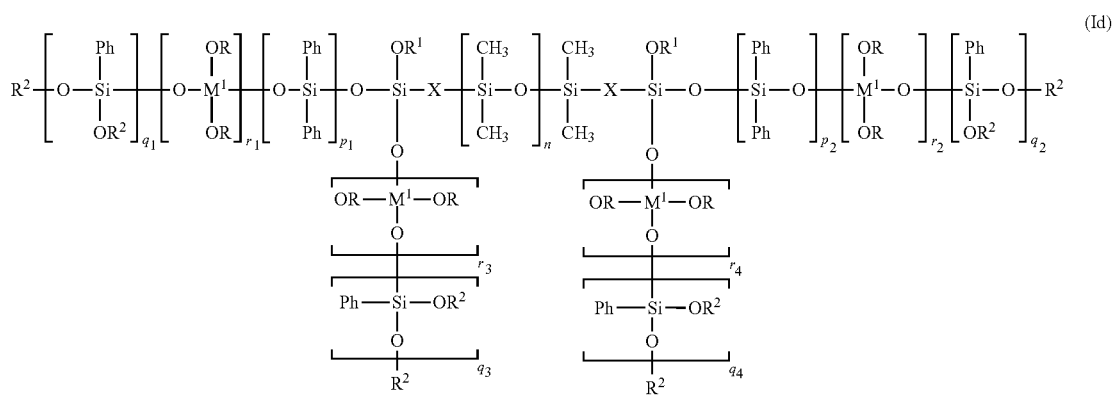

(Id)

-continued

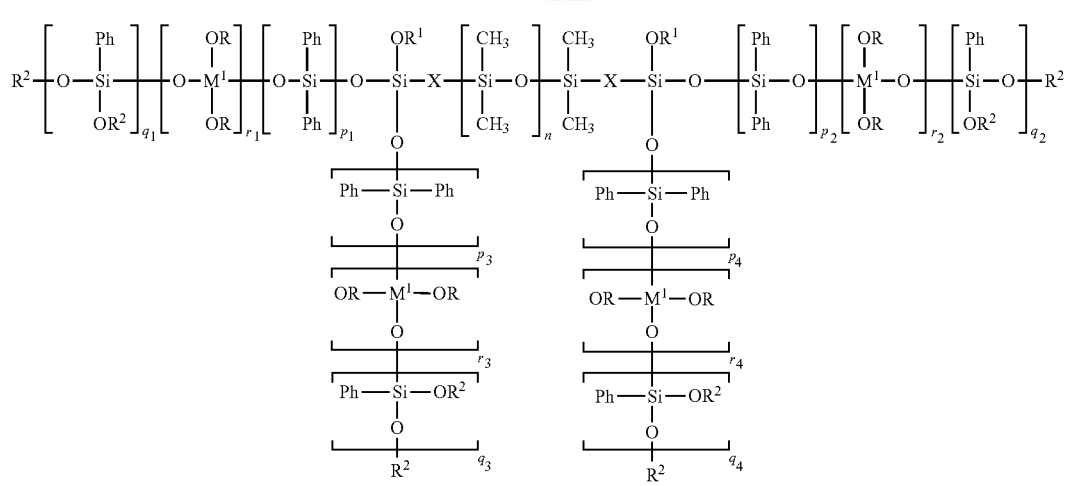

(Ie)

[Chemical Formula 5]

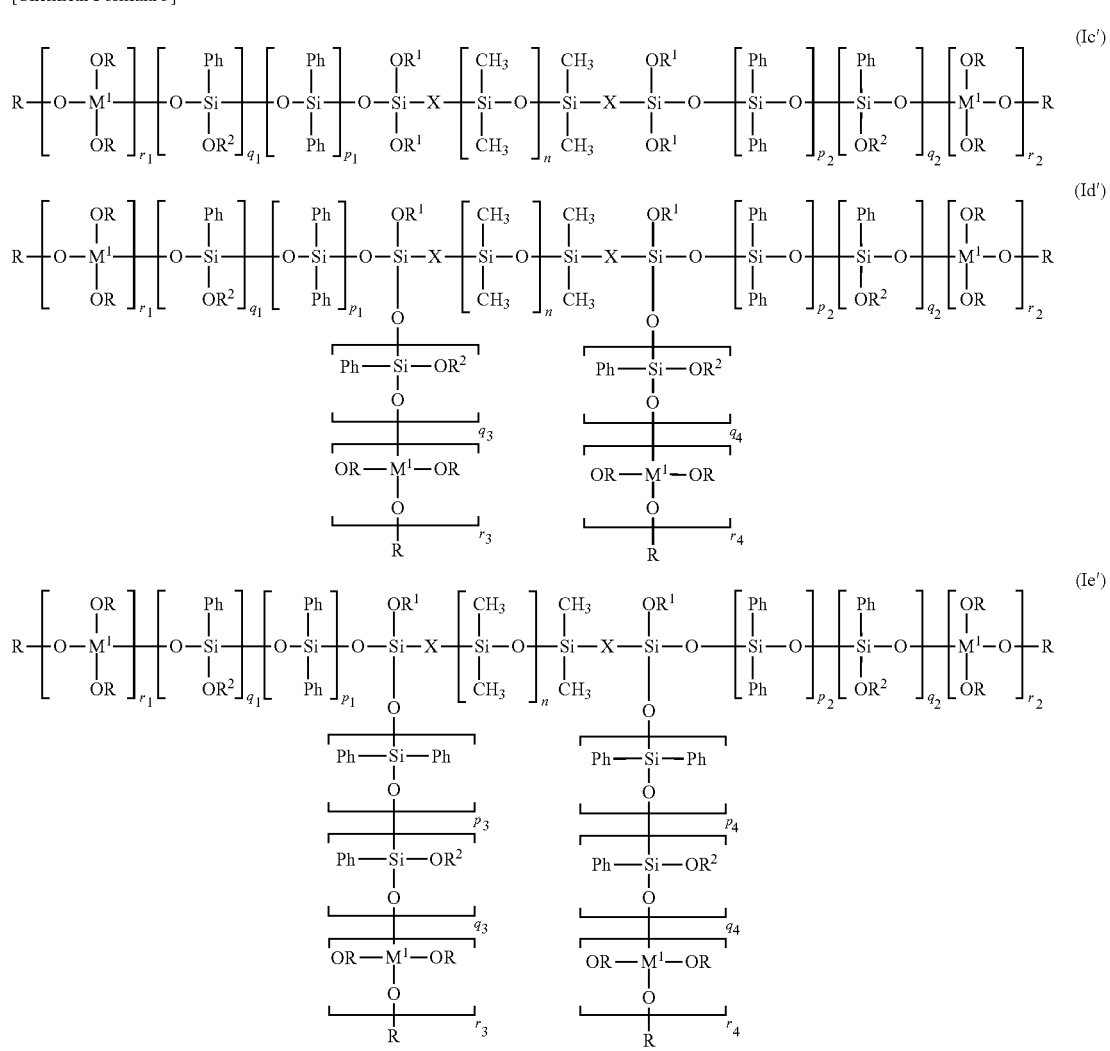

(Ic')

(Id')

(Ie')

wherein $R^1$ and $R^2$ are each an alkyl group having 1 to 3 carbon atoms or H ($R^1$ and $R^2$ may be the same or different, two or more $R^1$s may be all the same or different from each other, and two or more $R^2$s may be all the same or different from each other); R is an alkyl group having 3 to 8 carbon atoms or H (two or more Rs may be all the same or different from each other); Ph is a phenyl group; X is oxygen or an alkylene group having 2 or less carbon atoms; $M^1$ is Ti or Zr; n is a positive integer; $p_1$=0, 1, or 2 and $p_2$=0, 1, or 2 wherein $p_1+p_2 \geq 1$; $q_1=0$, 1, or 2 and $q_2=0$, 1, or 2 wherein $q_1+q_2 \geq 1$; $p_3=0$ or 1 and $p_4=0$ or 1 wherein $p_1 \geq p_3$ and $p_2 \geq p_4$; $q_3=0$, 1, or 2 and $q_4=0$, 1, or 2; and $r_1=0$ or 1, $r_2=0$ or 1, $r_3=0$ or 1, and $r_4=0$ or 1 wherein $r_1+r_2+r_3+r_4 \leq 2$.

(24) A phenyl-modified hybrid prepolymer (B) according to a fifth aspect of the present invention contains a structural unit represented by any one of the following formulas (If), (Ig), (Ih), (If'), (Ig'), and (Ih'):

[Chemical Formula 6]

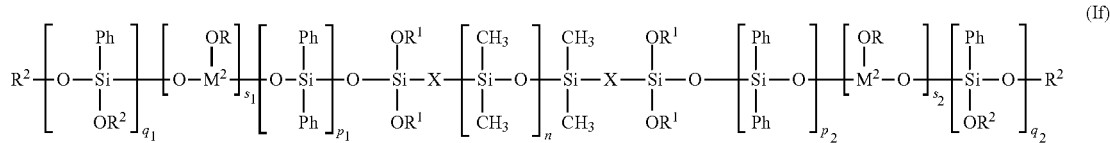
(If)

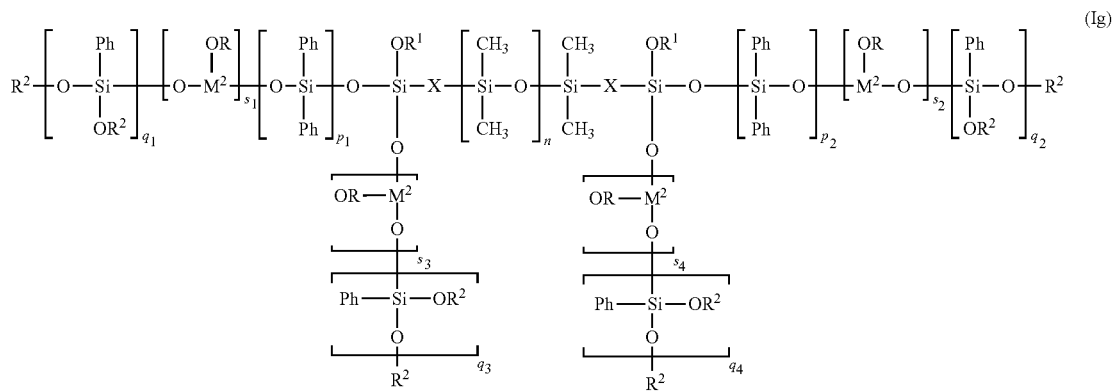
(Ig)

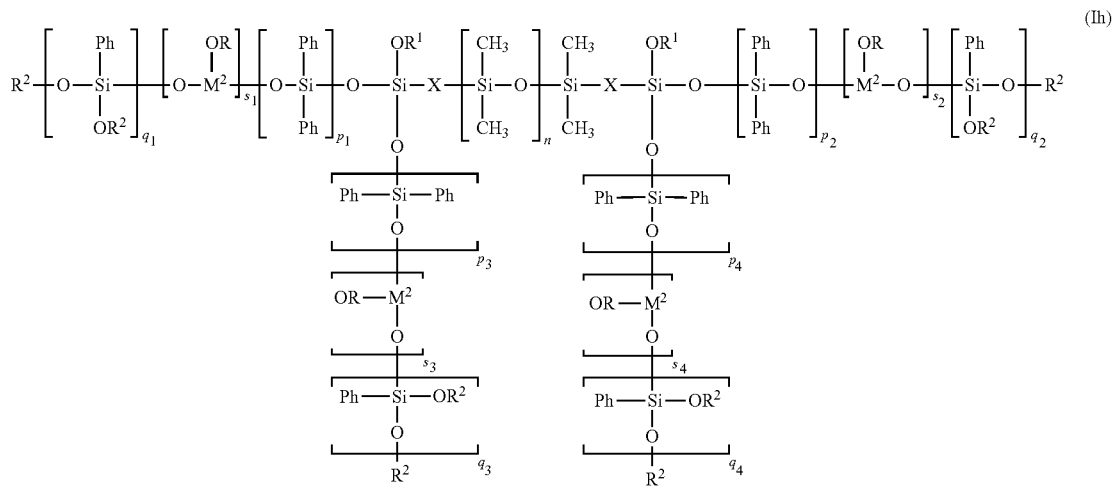
(Ih)

[Chemical Formula 7]

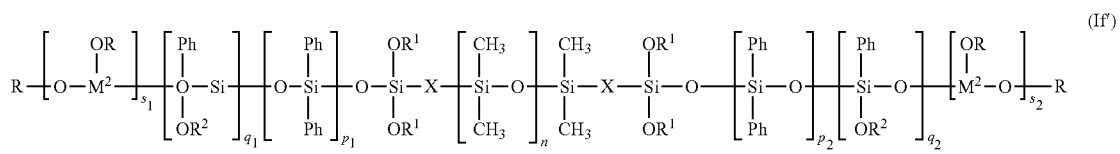
(If')

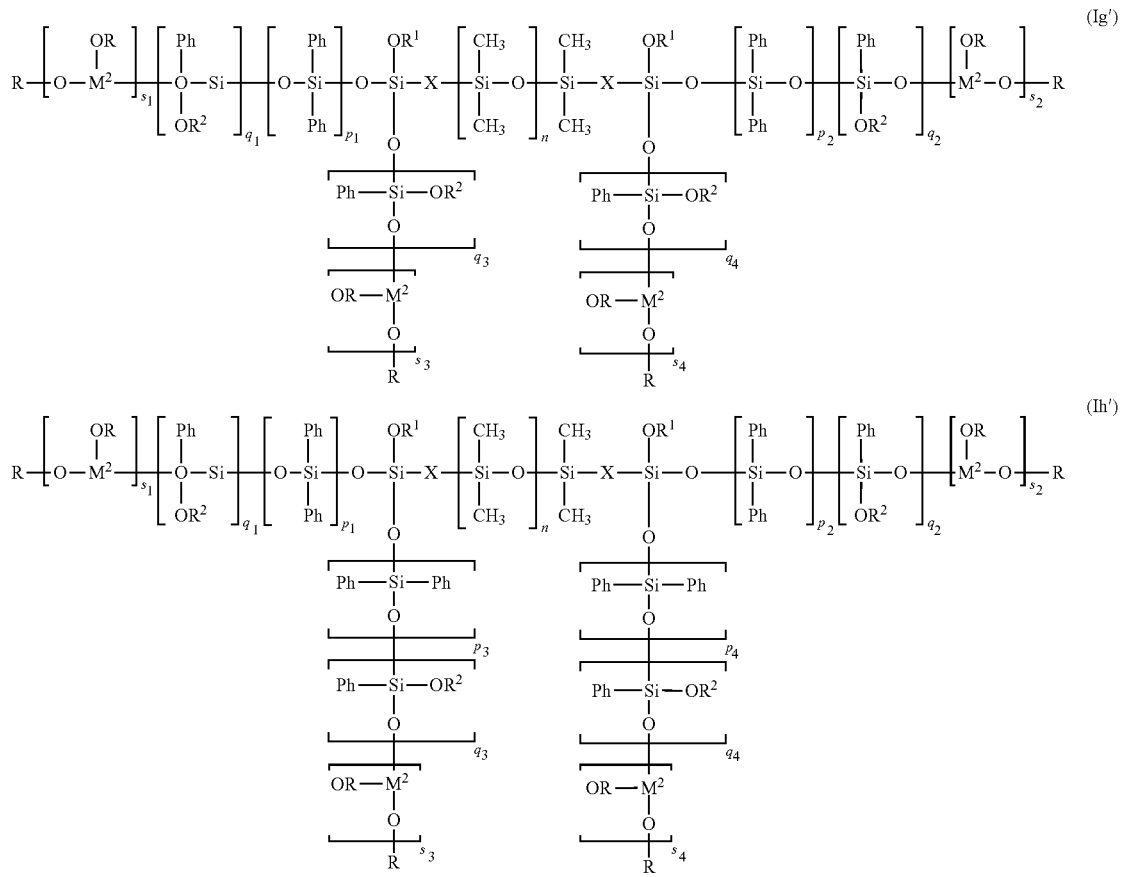

wherein $R^1$ and $R^2$ are each an alkyl group having 1 to 3 carbon atoms or H ($R^1$ and $R^2$ may be the same or different, two or more $R^1$s may be all the same or different from each other, and two or more $R^2$s may be all the same or different from each other); R is an alkyl group having 3 to 8 carbon atoms or H (two or more Rs may be all the same or different from each other); Ph is a phenyl group; X is oxygen or an alkylene group having 2 or less carbon atoms; $M^2$ is Al; n is a positive integer; $p_1$=0, 1, or 2 and $p_2$=0, 1, or 2 wherein $p_1+p_2$ 1; $q_1$=0, 1, or 2 and $q_2$=0, 1, or 2 wherein $q_1+q_2 \geq 1$; $p_3$=0 or 1 and $p_4$=0 or 1 wherein $p_1 \geq p_3$ and $p_2 \geq p_4$; $q_3$=0, 1, or 2 and $q_4$=0, 1, or 2; and $s_1$=0 or 1, $s_2$=0 or 1, $s_3$=0 or 1, and $s_4$=0 or 1 wherein $s_1+s_2+s_3+s_4 \leq 2$.

(25) A phenyl-modified polydimethylsiloxane-based hybrid prepolymer (C) according to a sixth aspect of the present invention is obtained by mixing the phenyl-modified hybrid prepolymer (B) according to any one of the above (22) to (24) and a phenyl-modified hybrid prepolymer (A) containing a structural unit represented by the following formula (IIa) or (IIb):

[Chemical Formula 8]

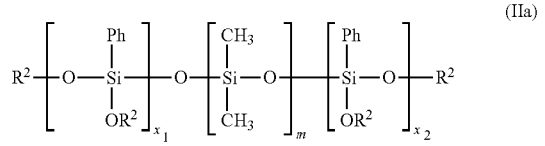

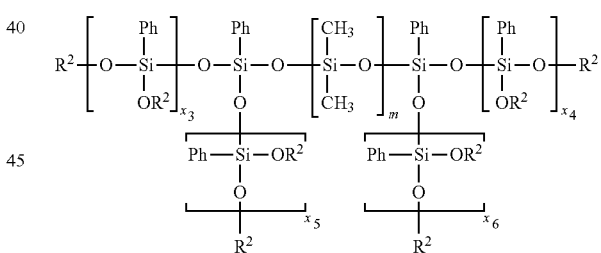

wherein $R^2$ is an alkyl group having 1 to 3 carbon atoms or H (two or more $R^2$s may be all the same or different from each other); Ph is a phenyl group; m is a positive integer; and $x_1$=0, 1, 2, or 3, $x_2$=0, 1, 2, or 3, $x_3$=0, 1, or 2, $x_4$=0, 1, or 2, $x_5$=0, 1, or 2, and $x_6$=0, 1, or 2 wherein $x_1+x_2 \geq 1$, $x_3+x_4 \geq 1$, $x_3 \geq x_5$, and $x_4 \geq x_6$.

(26) A phenyl-modified polydimethylsiloxane-based hybrid prepolymer (C) according to a seventh aspect of the present invention is obtained by mixing the phenyl-modified hybrid prepolymer (B) according to any one of the above (22) to (24) and a phenyl-modified hybrid prepolymer (A) containing a structural unit represented by any one of the following formulas (IIc), (IId), (IIc'), and (IId'):

[Chemical Formula 9]

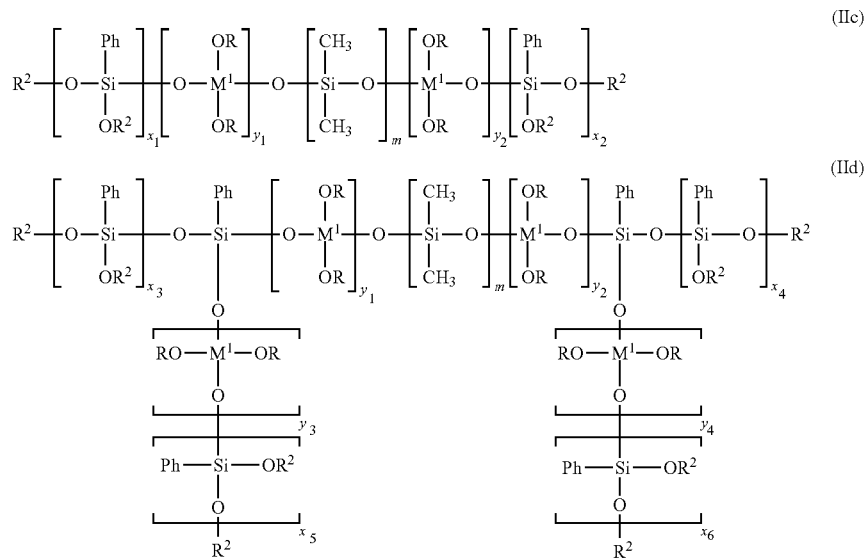

[Chemical Formula 10]

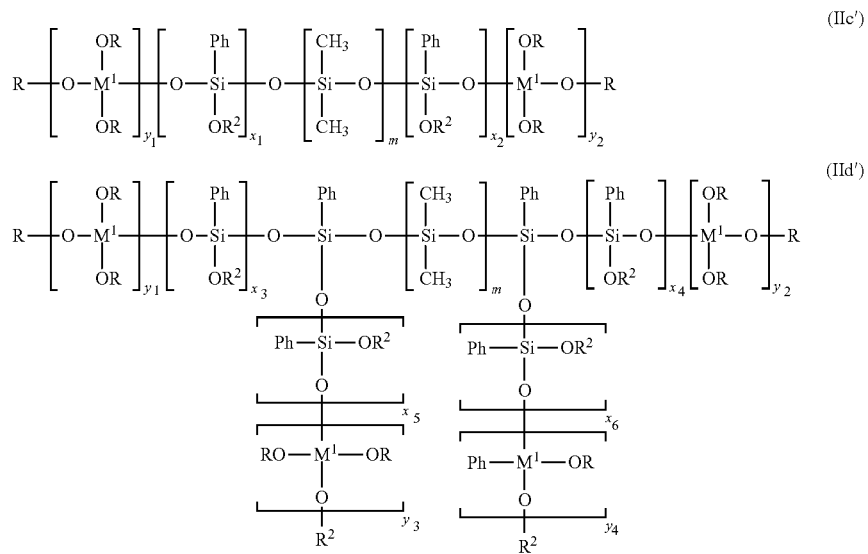

wherein $R^2$ is an alkyl group having 1 to 3 carbon atoms or H (two or more $R^2$s may be all the same or different from each other); R is an alkyl group having 3 to 8 carbon atoms or H (two or more Rs may be all the same or different from each other); Ph is a phenyl group; $M^1$ is Ti or Zr; m is a positive integer; $x_1=0$, 1, 2, or 3, $x_2=0$, 1, 2, or 3, $x_3=0$, 1, or 2, $x_4=0$, 1, or 2, $x_5=0$, 1, or 2, and $x_6=0$, 1, or 2 wherein $x_1+x_2\geq1$, $x_3+x_4\geq1$, $x_3\geq x_5$, and $x_4\geq x_6$; and $y_1=0$ or 1, $y_2=0$ or 1, $y_3=0$ or 1, and $y_4=0$ or 1 wherein $y_1+y_2+y_3+y_4\leq2$.

(27) A phenyl-modified polydimethylsiloxane-based hybrid prepolymer (C) according to an eighth aspect of the present invention is obtained by mixing the phenyl-modified hybrid prepolymer (B) according to any one of the above (22) to (24) and a phenyl-modified hybrid prepolymer (A) containing a structural unit represented by any one of the following formulas (IIe), (IIf), (IIe'), and (IIf'):

[Chemical Formula 11]

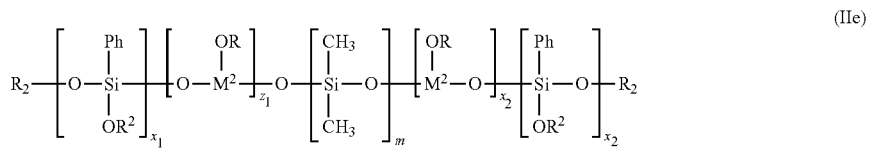

-continued

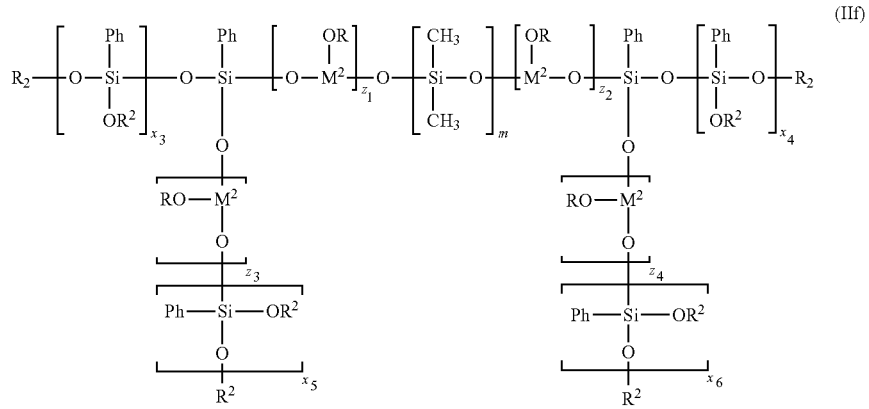

(IIf)

[Chemical Formula 12]

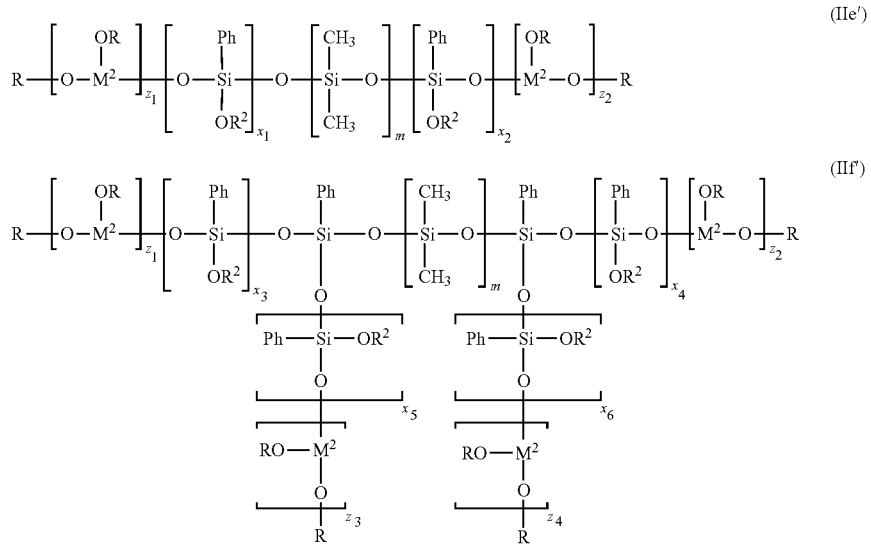

(IIe′)

(IIf′)

wherein $R^2$ is an alkyl group having 1 to 3 carbon atoms or H (two or more $R^2$s may be all the same or different from each other); R is an alkyl group having 3 to 8 carbon atoms or H (two or more Rs may be all the same or different from each other); Ph is a phenyl group; $M^2$ is Al; m is a positive integer; $x_1=0$, 1, 2, or 3, $x_2=0$, 1, 2, or 3, $x_3=0$, 1, or 2, $x_4=0$, 1, or 2, $x_5=0$, 1, or 2, and $x_6=0$, 1, or 2 wherein $x_1+x_2\geq 1$, $x_3+x_4\geq 1$, $x_3\geq x_5$, and $x_4\geq x_6$; and $z_1=0$ or 1, $z_2=0$ or 1, $z_3=0$ or 1, and $z_4=0$ or 1 wherein $z_1+z_2+z_3+z_4\leq 2$.

(28) A phenyl-modified polydimethylsiloxane-based hybrid polymer according to a ninth aspect of the present invention is obtained by heating and solidifying a phenyl-modified polydimethylsiloxane-based hybrid prepolymer (C) containing the phenyl-modified hybrid prepolymer (B) according to any one of the above (22) to (24), or the phenyl-modified polydimethylsiloxane-based hybrid prepolymer (C) according to any one of the above (25) to (27).

INDUSTRIAL APPLICABILITY

The phenyl-modified polydimethylsiloxane-based hybrid prepolymer according to the present invention provides a heat-resistant solid object, and the surface properties of the solid object can be controlled so that the solid object is widely industrially applicable as a heat-resistant material such as a matrix material of a member such as a heat dissipation sheet required to have flexibility, a sealing material for heat-generating elements, an adhesive, or an insulating or fixing film or tape for electronic parts or electric machinery parts.

The invention claimed is:

1. A phenyl-modified hybrid prepolymer (B) prepared by subjecting a polydimethylsiloxane having trialkoxysilyl groups at both ends, a phenyltrialkoxysilane, and a diphenyldialkoxysilane to a hydrolysis and condensation reaction.

2. The phenyl-modified hybrid prepolymer (B) according to claim 1, wherein the polydimethylsiloxane having trialkoxysilyl groups at both ends has a number-average molecular weight (Mn) of 3,000 to 30,000 and a distribution index of molecular weight (Mw/Mn; Mw is weight-average molecular weight) of 1.3 or less.

3. The phenyl-modified hybrid prepolymer (B) according to claim 1, which is prepared by subjecting the polydimethylsiloxane having trialkoxysilyl groups at both ends, the phenyltrialkoxysilane, and the diphenyldialkoxysilane to hydrolysis and condensation reaction in a molar ratio of 1:0.5 to 3:0.5 to 3, respectively.

4. The phenyl-modified hybrid prepolymer (B) according to claim 1, which is prepared using an alkoxide of titanium as a condensation catalyst.

5. A phenyl-modified polydimethylsiloxane-based hybrid prepolymer (C) comprising at least the phenyl-modified hybrid prepolymer (B) according to claim 1.

6. A phenyl-modified polydimethylsiloxane-based hybrid polymer obtained by heating and solidifying the phenyl-modified polydimethylsiloxane-based hybrid prepolymer (C) according to claim 5.

7. The phenyl-modified polydimethylsiloxane-based hybrid prepolymer (C), which is prepared by mixing the phenyl-modified hybrid prepolymer (B) according to claim 1 and a phenyl-modified hybrid prepolymer (A) prepared by condensation reaction between a polydimethylsiloxane having silanol groups at both ends and a phenyltrialkoxysilane.

8. The phenyl-modified polydimethylsiloxane-based hybrid prepolymer (C) according to claim 7, wherein the polydimethylsiloxane having silanol groups at both ends has a number-average molecular weight (Mn) of 18,000 to 60,000 and a distribution index of molecular weight (Mw/Mn; Mw is weight-average molecular weight) of 1.4 or less.

9. The phenyl-modified polydimethylsiloxane-based hybrid prepolymer (C) according to claim 7, wherein the polydimethylsiloxane having silanol groups at both ends used to prepare the phenyl-modified hybrid prepolymer (A) has a larger number-average molecular weight (Mn) than the polydimethylsiloxane having trialkoxysilyl groups at both ends used to prepare the phenyl-modified hybrid prepolymer (B).

10. The phenyl-modified polydimethylsiloxane-based hybrid prepolymer (C) according to claim 7, wherein the phenyl-modified hybrid prepolymer (A) is prepared by condensation reaction between the polydimethylsiloxane having silanol groups at both ends and the phenyltrialkoxysilane in a molar ratio of 1:0.5 to 5.

11. The phenyl-modified polydimethylsiloxane-based hybrid prepolymer (C) according to claim 7, wherein the phenyl-modified hybrid prepolymer (A) is prepared using an alkoxide of titanium as a condensation catalyst.

12. A method for producing a phenyl-modified hybrid prepolymer (B), comprising a step of subjecting a polydimethylsiloxane having trialkoxysilyl groups at both ends, a phenyltrialkoxysilane, and a diphenyldialkoxysilane to a hydrolysis and condensation reaction.

13. The method for producing a phenyl-modified hybrid prepolymer (B) according to claim 12, wherein the polydimethylsiloxane having trialkoxysilyl groups at both ends has a number-average molecular weight (Mn) of 3,000 to 30,000 and a distribution index of molecular weight (Mw/Mn; Mw is weight-average molecular weight) of 1.3 or less.

14. The method for producing a phenyl-modified hybrid prepolymer (B) according to claim 12, wherein in the hydrolysis and condensation reaction step, the polydimethylsiloxane having trialkoxysilyl groups at both ends, the phenyltrialkoxysilane, and the diphenyldialkoxysilane are subjected to hydrolysis and condensation reaction in a molar ratio of 1:0.5 to 3:0.5 to 3, respectively.

15. The method for producing a phenyl-modified hybrid prepolymer (B) according to claim 12, wherein in the hydrolysis and condensation reaction step, an alkoxide of titanium is used as a condensation catalyst.

16. A method for producing a phenyl-modified polydimethylsiloxane-based hybrid prepolymer (C), comprising a step of mixing a phenyl-modified hybrid prepolymer (B) produced by the method according to claim 12 and a phenyl-modified hybrid prepolymer (A) prepared by condensation reaction between a polydimethylsiloxane having silanol groups at both ends and a phenyltrialkoxysilane.

17. The method for producing a phenyl-modified polydimethylsiloxane-based hybrid prepolymer (C) according to claim 16, wherein the polydimethylsiloxane having silanol groups at both ends has a number-average molecular weight (Mn) of 18,000 to 60,000 and a distribution index of molecular weight (Mw/Mn; Mw is weight-average molecular weight) of 1.4 or less.

18. The method for producing a phenyl-modified polydimethylsiloxane-based hybrid prepolymer (C) according to claim 16, wherein the polydimethylsiloxane having silanol groups at both ends used to prepare the phenyl-modified hybrid prepolymer (A) has a larger number-average molecular weight (Mn) than the polydimethylsiloxane having trialkoxysilyl groups at both ends used to prepare the phenyl-modified hybrid prepolymer (B).

19. The method for producing a phenyl-modified polydimethylsiloxane-based hybrid prepolymer (C) according to claim 16, wherein the phenyl-modified hybrid prepolymer (A) is prepared by condensation reaction between the polydimethylsiloxane having silanol groups at both ends and the phenyltrialkoxysilane in a molar ratio of 1:0.5 to 5.

20. The method for producing a phenyl-modified polydimethylsiloxane-based hybrid prepolymer (C) according to claim 16, wherein the phenyl-modified hybrid prepolymer (A) is prepared using an alkoxide of titanium as a condensation catalyst.

21. A method for producing a phenyl-modified polydimethylsiloxane-based hybrid polymer, comprising a step of heating and solidifying a phenyl-modified polydimethylsiloxane-based hybrid prepolymer (C) produced by the method according to claim 16.

22. A method for producing a phenyl-modified polydimethylsiloxane-based hybrid polymer, comprising a step of heating and solidifying a phenyl-modified polydimethylsiloxane-based hybrid prepolymer (C) comprising a phenyl-modified hybrid prepolymer (B) produced by the method according to claim 12.

23. A phenyl-modified hybrid prepolymer (B) containing a structural unit represented by the following formula (Ia) or (Ib):

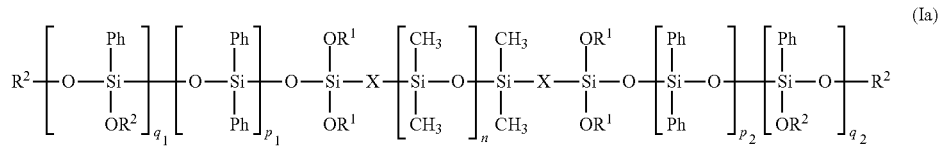

(Ia)

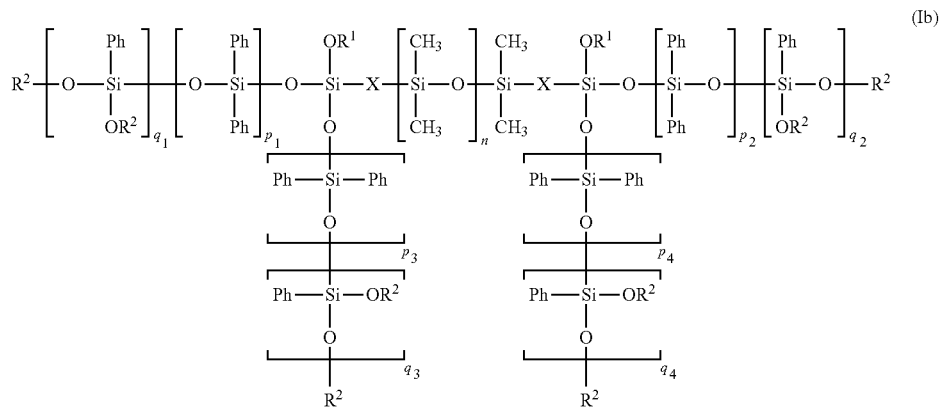

(Ib)

wherein $R^1$ and $R^2$ are each an alkyl group having 1 to 3 carbon atoms or H ($R^1$ and $R^2$ may be the same or different, two or more $R^1$s may be all the same or different from each other, and two or more $R^2$s may be all the same or different from each other); Ph is a phenyl group; X is oxygen or an alkylene group having 2 or less carbon atoms; n is a positive integer; $p_1=0$, 1, or 2 and $p_2=0$, 1, or 2 wherein $p_1+p_2 \geq 1$; $q_1=0$, 1, or 2 and $q_2=0$, 1, or 2 wherein $q_1+q_2 \geq 1$; $p_3=0$ or 1 and $p_4=0$ or 1 wherein $p_1 \geq p_3$ and $p_2 \geq p_4$; $q_3=0$, 1, or 2 and $q_4=0$, 1, or 2.

24. A phenyl-modified polydimethylsiloxane-based hybrid prepolymer (C) obtained by mixing the phenyl-modified hybrid prepolymer (B) according to claim 23 and a phenyl-modified hybrid prepolymer (A) containing a structural unit represented by the following formula IIa) or (IIb):

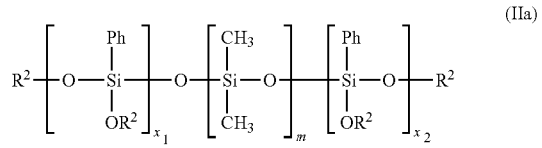

(IIa)

-continued

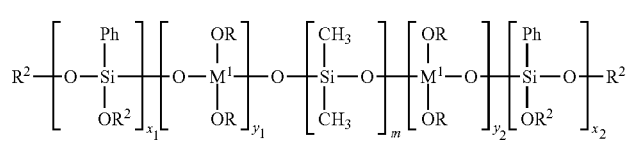

(IIb)

wherein $R^2$ is an alkyl group having 1 to 3 carbon atoms or H (two or more $R^2$s may be all the same or different from each other); Ph is a phenyl group, m is a positive integer; and $x_1=0$, 1, 2, or 3, $x_2=0$, 1, 2, or 3, $x_3=0$, 1, or 2, $x_4=0$, 1, or 2, $x_5=0$, 1, or 2, and $x_6=0$, 1, or 2 wherein $x_1+x_2 \geq 1$, $x_3+x_4 \geq 1$, $x_3 \geq x_5$, and $x_4 \geq x_6$.

25. A phenyl-modified polydimethylsiloxane-based hybrid polymer obtained by heating and solidifying the phenyl-modified polydimethylsiloxane-based hybrid prepolymer (C) according to claim 24.

26. A phenyl-modified polydimethylsiloxane-based hybrid prepolymer (C) obtained by mixing the phenyl-modified hybrid prepolymer (B) according to claim 23 and a phenyl-modified hybrid prepolymer (A) containing a structural unit represented by any one of the following formulas (IIc), (IId), (IIc'), and (IId'):

(IIc)

-continued

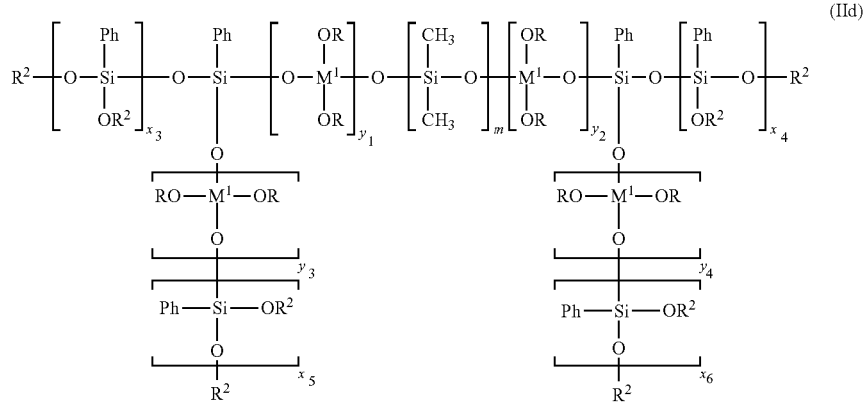
(IId)

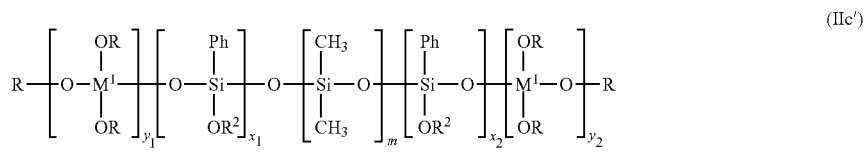
(IIc′)

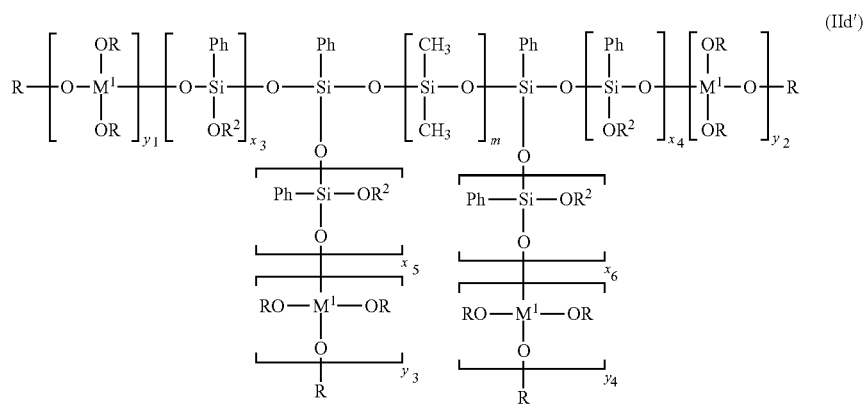
(IId′)

wherein $R^2$ is an alkyl group having 1 to 3 carbon atoms or H (two or more $R^2$s may be all the same or different from each other); R is an alkyl group having 3 to 8 carbon atoms or H (two or more Rs may be all the same or different from each other); Ph is a phenyl group; $M^1$ is Ti or Zr; m is a positive integer; $x_1$=0, 1, 2, or 3, $x_2$=0, 1, 2, or 3, $x_3$=0, 1, or 2, $x_4$=0, 1, or 2, $x_5$=0, 1, or 2, and $x_6$=0, 1, or 2 wherein $x_1+x_2 \geq 1$, $x_3+x_4 \geq 1$, $x_3 \geq x_5$, and $x_4 \geq x_6$; and $y_1$=0 or 1, $y_2$=0 or 1, $y_3$=0 or 1, and $y_4$=0 or 1 wherein $y_1+y_2+y_3+y_4 \geq 2$.

27. A phenyl-modified polydimethylsiloxane-based hybrid polymer obtained by heating and solidifying the phenyl-modified polydimethylsiloxane-based hybrid prepolymer (C) according to claim 26.

28. A phenyl-modified polydimethylsiloxane-based hybrid prepolymer (C) obtained by mixing the phenyl-modified hybrid prepolymer (B) according to claim 23 and a phenyl-modified hybrid prepolymer (A) containing a structural unit represented by any one of the following formulas (IIe), (IIf, (IIe'), and (IIf'),

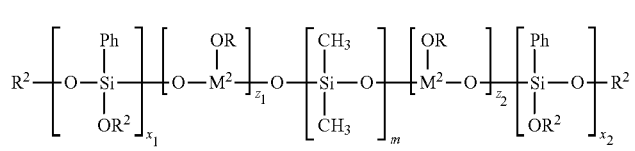
(IIe)

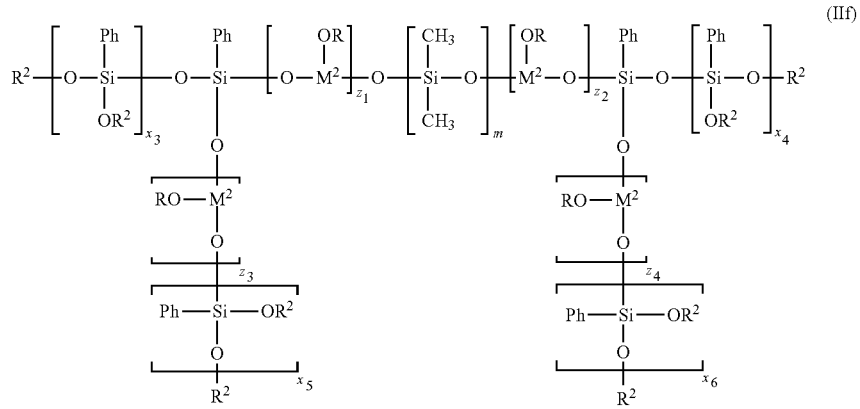

(IIf)

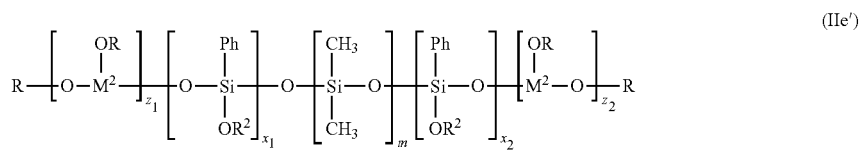

(IIe')

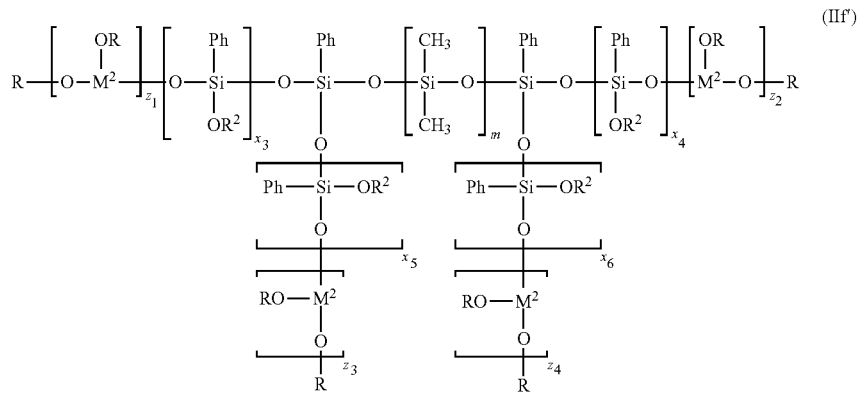

(IIf')

wherein $R^2$ is an alkyl group having 1 to 3 carbon atoms or H (two or more $R^2$s may be all the same or different from each other); R is an alkyl group having 3 to 8 carbon atoms or H (two or more Rs may be all the same or different from each other); Ph is a phenyl group; $M^2$ is Al; m is a positive integer; $x_1=0$, 1, 2, or 3, $x_2=0$, 1, 2, or 3, $x_3=0$, 1, or 2, $x_4=0$, 1, or 2, $x_5=0$, 1, or 2, and $x_6=0$, 1, or 2 wherein $x_1+x_2\geq 1$, $x_3+x_4\geq 1$, $x_3\geq x_5$, and $x_4\geq x_6$; and $z_1=0$ or 1, $z_2=0$ or 1, $z_3=0$ or 1, and $z_4=0$ or 1 wherein $z_1+z_2+z_3+z_4\geq 2$.

29. A phenyl-modified polydimethylsiloxane-based hybrid polymer obtained by heating and solidifying the phenyl-modified polydimethylsiloxane-based hybrid prepolymer (C) according to claim 28.

30. A phenyl-modified polydimethylsiloxane-based hybrid polymer obtained by heating and solidifying a phenyl-modified polydimethylsiloxane-based hybrid prepolymer (C) containing the phenyl-modified hybrid prepolymer (B) according to claim 23.

31. A phenyl-modified hybrid prepolymer (B) containing a structural unit represented by any one of the following formulas (Ic), (Id), (Ie), (Ic'), (Id'), and (Ie'):

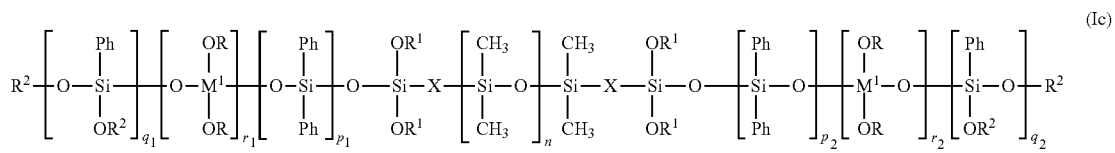

(Ic)

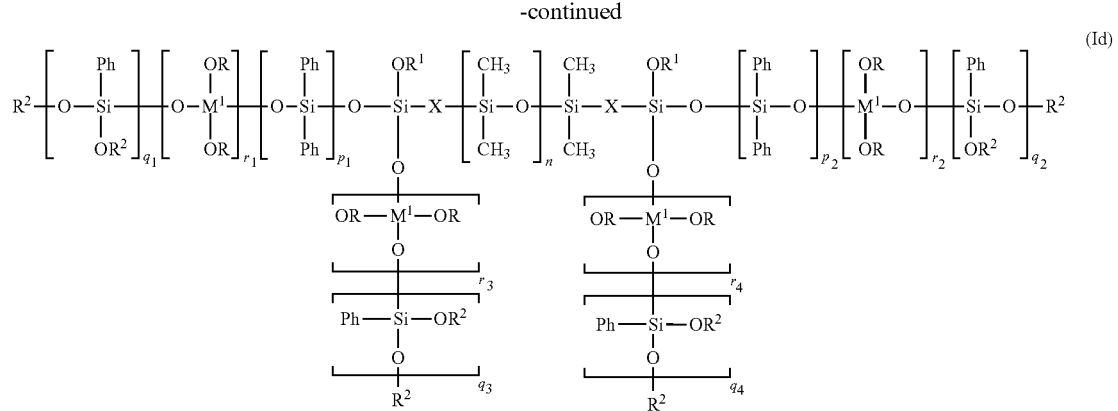
(Id)
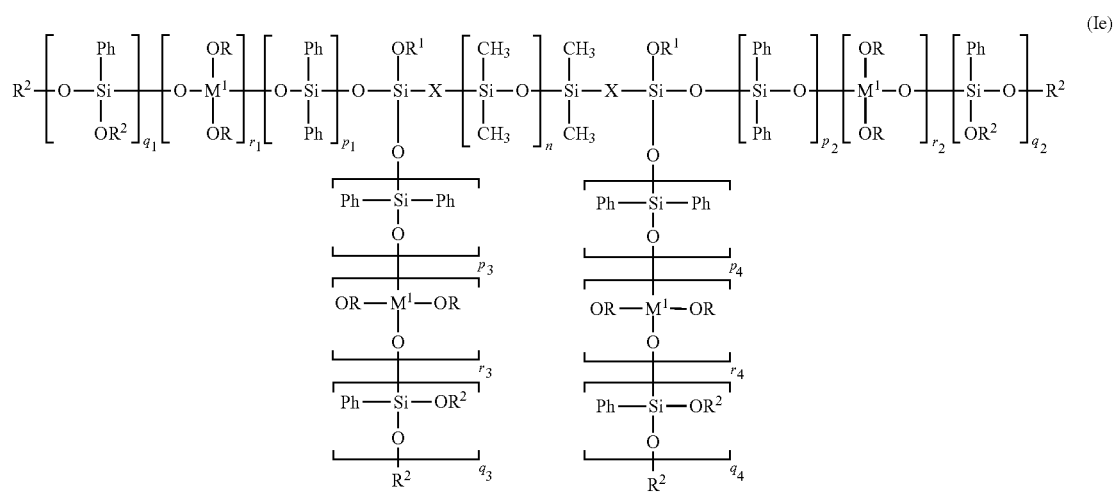
(Ie)
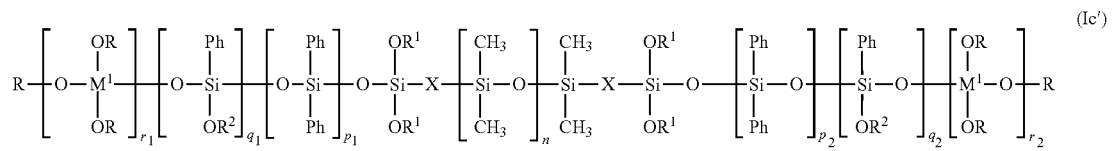
(Ic')
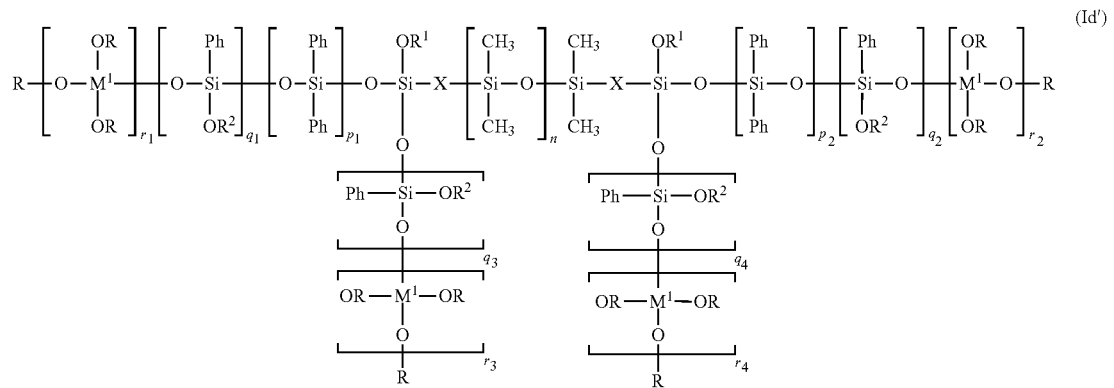
(Id')

-continued

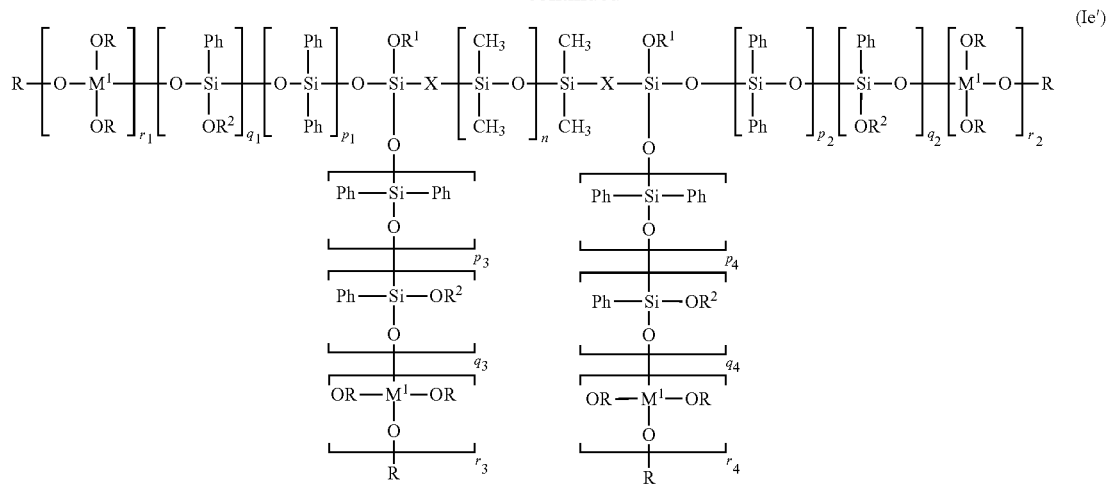
(Ie')

wherein $R^1$ and $R^2$ are each an alkyl group having 1 to 3 carbon atoms or H ($R^1$ and $R^2$ may be the same or different, two or more $R^1$s may be all the same or different from each other, and two or more $R^2$s may be all the same or different from each other); R is an alkyl group having 3 to 8 carbon atoms or H (two or more Rs may be all the same or different from each other); Ph is a phenyl group; X is oxygen or an alkylene group having 2 or less carbon atoms; $M^1$ is Ti or Zr; n is a positive integer; $p_1=0$, 1, or 2 and $p_2=0$, 1, or 2 wherein $p_1+p_2\geq 1$; $q_1=0$, 1, or 2 and $q_2=0$, 1, or 2 wherein $q_1+q_2\geq 1$; $p_3=0$ or 1 and $p_4=0$ or 1 wherein $p_1\geq p_3$ and $p_2\geq p_4$; $q_3=0$, 1, or 2 and $q_4=0$, 1, or 2; and $r_1=0$ or 1, $r_2=0$ or 1, $r_3=0$ or 1, and $r_4=0$ or 1 wherein $r_1+r_2+r_3+r_4\geq 2$.

32. A phenyl-modified hybrid prepolymer (B) containing a structural unit represented by any one of the following formulas (If), (Ig), (Ih), (If'), (Ig'), and (Ih'):

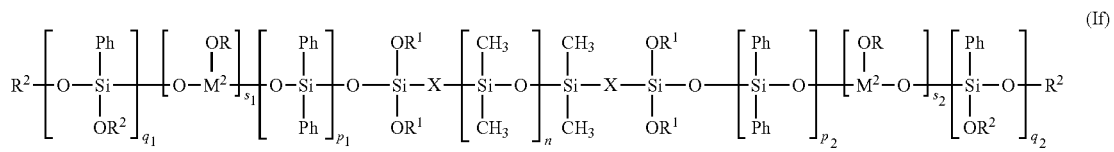
(If)

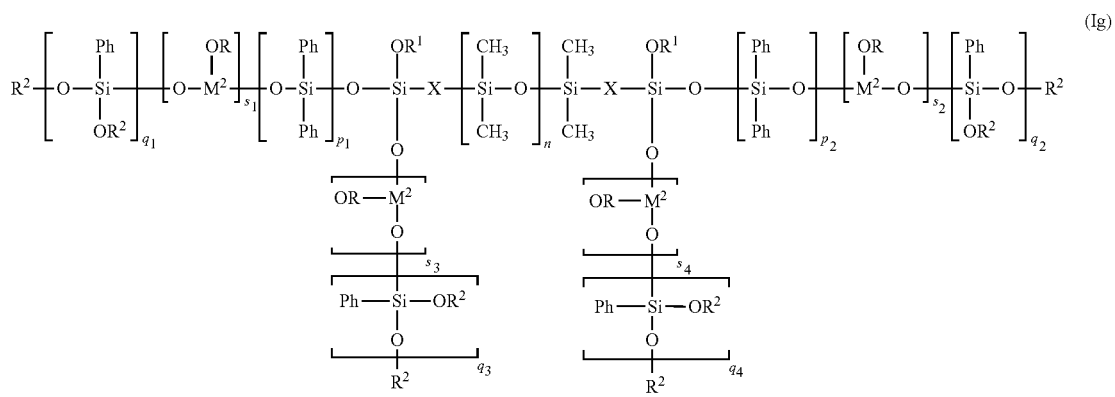
(Ig)

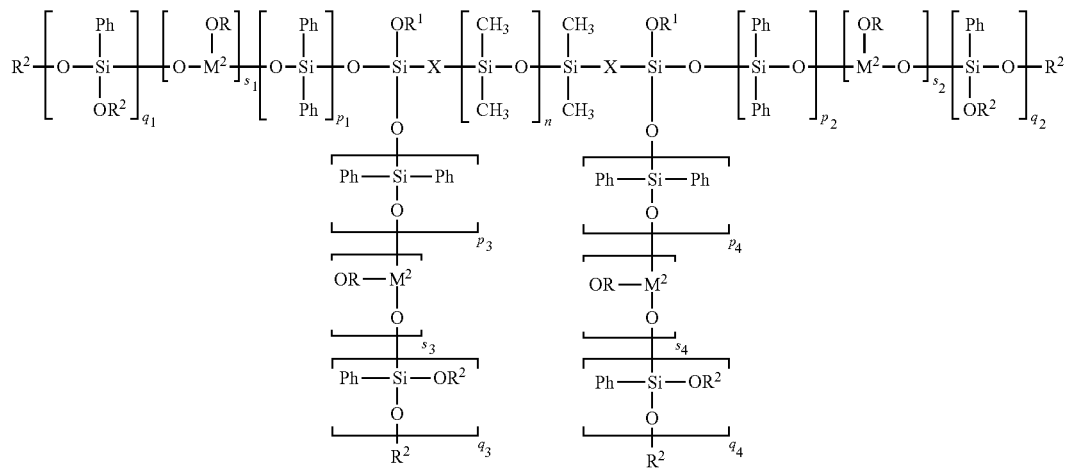

(Ih)

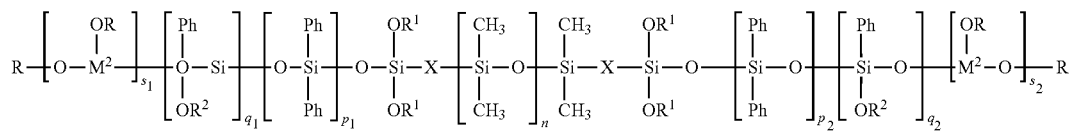

(If′)

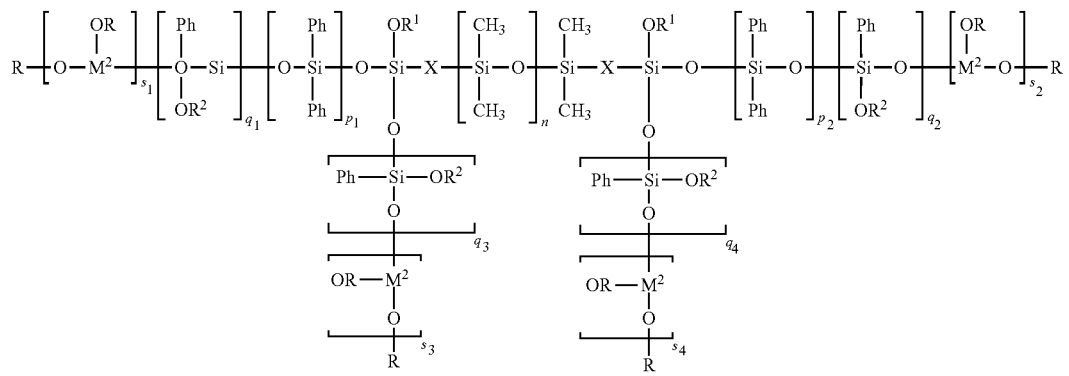

(Ig′)

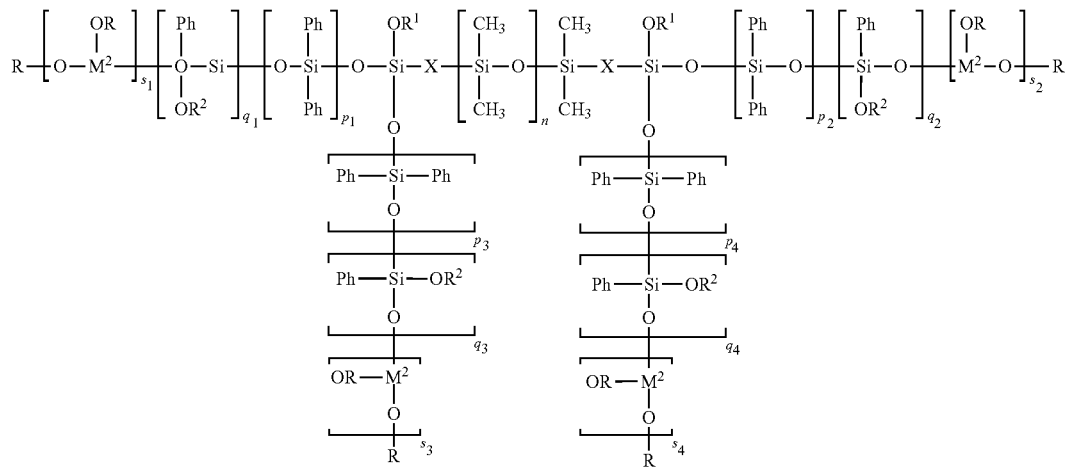

(Ih′)

wherein $R^1$ and $R^2$ are each an alkyl group having 1 to 3 carbon atoms or H ($R^1$ and $R^2$ may be the same or different, two or more $R^1$s may be all the same or different from each other, and two or more $R^2$s may be all the same or different from each other); R is an alkyl group having 3 to 8 carbon atoms or H (two or more Rs may be all the same or different from each other); Ph is a phenyl group; X is oxygen or an alkylene group having 2 or less carbon atoms; $M^2$ is Al; n is a positive integer; $p_1=0$, 1, or 2 and $p_2=0$, 1, or 2 wherein $p_1+p_2 \geq 1$; $q_1=0$, 1, or 2 and $q_2=0$, 1, or 2 wherein $q_1+q_2 \geq 1$; $p_3=0$ or 1 and $p_4=0$ or 1 wherein $p_1 \geq p_3$ and $p_2 \geq p_4$; $q_3 = 0$, 1, or 2 and $q_4 = 0$, 1, or 2; and $s_1 = 0$ or 1, $s_2 = 0$ or 1, $s_3 = 0$ or 1, and $s_4 = 0$ or 1 wherein $s_1 + s_2 + s_3 + s_4 \geq 2$.

\* \* \* \* \*